United States Patent
Long et al.

(10) Patent No.: US 12,514,262 B1
(45) Date of Patent: Jan. 6, 2026

(54) FEATURE FOR PREVENTING MATERIAL BUILDUP IN A MIXING VESSEL OF A DRINK MAKER

(71) Applicant: SharkNinja Operating LLC, Needham, MA (US)

(72) Inventors: Tyler Long, West Roxbury, MA (US); Adelene Chan, New Providence, NJ (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 19/016,522

(22) Filed: Jan. 10, 2025

(51) Int. Cl.
*A23G 9/04* (2006.01)
*A23G 9/22* (2006.01)

(52) U.S. Cl.
CPC ............. *A23G 9/224* (2013.01); *A23G 9/045* (2013.01)

(58) Field of Classification Search
CPC .................................. A23G 9/04; A23G 9/224
See application file for complete search history.

(56) References Cited

U.S. PATENT DOCUMENTS

| | | |
|---|---|---|
| 531,718 A | 1/1895 | Detwiler et al. |
| 718,319 A | 1/1903 | Cunningham |
| 789,599 A | 5/1905 | Flatau |
| 970,823 A | 9/1910 | Hopkins |
| 975,380 A | 11/1910 | Berntson |
| 1,425,814 A | 8/1922 | Valerius et al. |
| 1,685,189 A | 9/1928 | Cover |
| 1,818,896 A | 8/1931 | Kohr |
| 1,896,081 A | 2/1933 | Hampson |
| 1,953,766 A | 4/1934 | McMath et al. |
| 2,064,861 A | 12/1936 | Stroud |
| 2,134,261 A | 10/1938 | Oswell et al. |
| 2,136,224 A | 11/1938 | Weinreich |
| 2,141,045 A | 12/1938 | Ruttiman |
| 2,188,551 A | 1/1940 | Kaltenbach et al. |
| 2,252,205 A | 8/1941 | Reynolds |
| 2,278,125 A | 3/1942 | Landgraf |
| 2,284,155 A | 5/1942 | Landgraf |
| 2,316,165 A | 4/1943 | Howser |

(Continued)

FOREIGN PATENT DOCUMENTS

| | | |
|---|---|---|
| CN | 3029700 D | 1/1995 |
| CN | 3032479 D | 6/1995 |

(Continued)

OTHER PUBLICATIONS

Pending U.S. Appl. No. 18/817,545, filed Aug. 28, 2024; Cameron John Auger, Joyce Tu, Michael Lerman, Alexander Mularski, Macrae Benziger, Ryan Michienzi.

(Continued)

*Primary Examiner* — Elizabeth Insler
(74) *Attorney, Agent, or Firm* — The Webb Law Firm

(57) ABSTRACT

A feature for preventing material buildup in a mixing vessel of a frozen drink maker is described. The feature may include at least one protrusion extending into a vessel chamber of a mixing vessel. The at least one protrusion may be positioned on a central axis of a dasher that is positioned within the vessel chamber and the at least one protrusion may be sized and configured to fit into a space defined by one or more mixing blades of the dasher at a first end of the dasher.

20 Claims, 21 Drawing Sheets

(56) References Cited

U.S. PATENT DOCUMENTS

| | | | |
|---|---|---|---|
| 2,352,205 A | 6/1944 | Karlson | |
| 2,352,232 A | 6/1944 | Strauss | |
| 2,411,081 A | 11/1946 | Carothers | |
| 2,541,814 A | 2/1951 | Gaddini | |
| 2,794,627 A | 6/1957 | Rodwick | |
| 2,836,401 A * | 5/1958 | Phelan | A23G 9/224 |
| | | | 62/343 |
| 2,896,421 A | 7/1959 | Rader | |
| 2,897,862 A | 8/1959 | Malz et al. | |
| 2,972,239 A | 2/1961 | Vasby | |
| 3,155,053 A | 11/1964 | De Vito et al. | |
| 3,175,594 A | 3/1965 | Jepson et al. | |
| 3,191,398 A | 6/1965 | Rader | |
| 3,228,203 A | 1/1966 | Swenson | |
| 3,292,911 A | 12/1966 | Paul | |
| 3,300,094 A | 1/1967 | Rockola | |
| 3,319,436 A | 5/1967 | Wilch | |
| 3,400,551 A | 9/1968 | Booth et al. | |
| 3,460,716 A | 8/1969 | Thomas | |
| 3,460,717 A | 8/1969 | Thomas | |
| 3,465,540 A | 9/1969 | Carpigiani | |
| 3,580,812 A | 5/1971 | Bender et al. | |
| 3,632,245 A | 1/1972 | Getman | |
| 3,822,565 A | 7/1974 | Arzberger | |
| 3,939,667 A | 2/1976 | Halverson | |
| 3,988,902 A | 11/1976 | Jacobs | |
| 4,078,263 A | 3/1978 | Campbell | |
| 4,084,407 A | 4/1978 | Anhalt | |
| 4,157,017 A | 6/1979 | Reid | |
| 4,162,127 A | 7/1979 | Wakeman et al. | |
| 4,241,590 A | 12/1980 | Martineau | |
| 4,245,680 A | 1/1981 | Greenfield, Jr. et al. | |
| 4,275,567 A | 6/1981 | Schwitters | |
| 4,332,539 A | 6/1982 | Zani | |
| 4,394,938 A | 7/1983 | Frassanito | |
| 4,401,607 A | 8/1983 | Child et al. | |
| 4,429,549 A | 2/1984 | Randolphi | |
| 4,476,146 A | 10/1984 | Manfroni | |
| 4,487,024 A | 12/1984 | Fletcher et al. | |
| 4,521,116 A | 6/1985 | Adsit | |
| 4,528,824 A | 7/1985 | Herbert | |
| 4,637,221 A | 1/1987 | Levine | |
| 4,653,281 A | 3/1987 | Van Der Veer | |
| 4,664,529 A | 5/1987 | Cavalli | |
| 4,681,030 A | 7/1987 | Herbert | |
| 4,681,458 A | 7/1987 | Cavalli | |
| 4,698,984 A | 10/1987 | Manfroni | |
| 4,708,487 A | 11/1987 | Marshall | |
| 4,711,374 A | 12/1987 | Gaunt et al. | |
| 4,711,376 A | 12/1987 | Manfroni | |
| 4,712,920 A | 12/1987 | Ames et al. | |
| 4,725,008 A | 2/1988 | Rebordosa et al. | |
| 4,736,593 A | 4/1988 | Williams | |
| 4,740,088 A | 4/1988 | Kelly, Jr. | |
| 4,900,158 A | 2/1990 | Ugolini | |
| 4,906,486 A | 3/1990 | Young | |
| 4,964,542 A | 10/1990 | Smith | |
| 5,020,698 A | 6/1991 | Crossley | |
| 5,158,506 A | 10/1992 | Kusano et al. | |
| 5,205,129 A | 4/1993 | Wright et al. | |
| 5,212,954 A | 5/1993 | Black et al. | |
| 5,363,746 A | 11/1994 | Gordon | |
| 5,389,209 A | 2/1995 | Paquette | |
| 5,419,150 A | 5/1995 | Kaiser et al. | |
| 5,463,878 A | 11/1995 | Parekh et al. | |
| 5,524,451 A | 6/1996 | Tippmann | |
| 5,603,229 A | 2/1997 | Cocchi et al. | |
| 5,644,926 A | 7/1997 | Kress | |
| 5,676,462 A | 10/1997 | Fraczek et al. | |
| 5,692,392 A | 12/1997 | Swier | |
| 5,706,720 A | 1/1998 | Goch et al. | |
| 5,735,602 A | 4/1998 | Salvatore | |
| 5,788,370 A | 8/1998 | Pedrazzi | |
| 5,799,726 A | 9/1998 | Frank | |
| 5,823,672 A | 10/1998 | Barker | |
| 5,906,105 A | 5/1999 | Ugolini | |
| 5,967,226 A | 10/1999 | Choi | |
| 6,010,035 A | 1/2000 | Estruch | |
| 6,055,900 A | 5/2000 | Bunn | |
| 6,058,721 A | 5/2000 | Midden et al. | |
| 6,070,417 A | 6/2000 | Benson | |
| 6,082,123 A | 7/2000 | Johnson | |
| 6,119,472 A | 9/2000 | Ross | |
| 6,176,090 B1 | 1/2001 | Ufema | |
| 6,182,862 B1 | 2/2001 | McGill | |
| 6,220,047 B1 | 4/2001 | Vogel et al. | |
| 6,253,573 B1 | 7/2001 | Schwitters et al. | |
| 6,264,066 B1 | 7/2001 | Vincent et al. | |
| 6,301,918 B1 | 10/2001 | Quartarone et al. | |
| 6,349,852 B1 | 2/2002 | Ford | |
| 6,370,892 B1 | 4/2002 | Ross | |
| 6,438,987 B1 | 8/2002 | Pahl | |
| 6,490,872 B1 | 12/2002 | Beck et al. | |
| 6,513,578 B2 | 2/2003 | Frank | |
| 6,546,843 B2 | 4/2003 | Ugolini | |
| 6,553,779 B1 | 4/2003 | Boyer et al. | |
| 6,557,835 B2 | 5/2003 | Dijk | |
| 6,619,056 B2 | 9/2003 | Midden et al. | |
| 6,622,511 B2 | 9/2003 | Ashworth et al. | |
| 6,637,214 B1 | 10/2003 | Leitzke et al. | |
| 6,679,314 B2 | 1/2004 | Frank | |
| 6,694,752 B2 | 2/2004 | Nomura et al. | |
| 6,705,106 B1 | 3/2004 | Cunha et al. | |
| 6,735,967 B1 | 5/2004 | Bischel et al. | |
| 6,761,036 B2 | 7/2004 | Teague et al. | |
| 6,766,650 B2 | 7/2004 | Cunha et al. | |
| 6,772,675 B2 | 8/2004 | Ervin | |
| 6,808,305 B2 | 10/2004 | Sharpe et al. | |
| 6,817,749 B2 | 11/2004 | Saunders et al. | |
| 6,830,239 B1 | 12/2004 | Weber et al. | |
| 6,863,916 B2 | 3/2005 | Henriksen et al. | |
| 6,907,743 B2 | 6/2005 | Cocchi et al. | |
| 6,918,258 B2 | 7/2005 | Cunha et al. | |
| 6,923,010 B2 | 8/2005 | Small et al. | |
| 6,932,503 B2 | 8/2005 | Fallowes | |
| 6,948,327 B2 | 9/2005 | Bischel et al. | |
| 7,028,607 B2 | 4/2006 | Zweben | |
| 7,047,758 B2 | 5/2006 | Ross | |
| 7,100,392 B2 | 9/2006 | Cortese | |
| 7,152,765 B1 | 12/2006 | Midden et al. | |
| 7,165,699 B2 | 1/2007 | McGill | |
| 7,213,965 B2 | 5/2007 | Daniels, Jr. | |
| 7,264,187 B1 | 9/2007 | Kolar | |
| 7,269,960 B2 | 9/2007 | Elsom et al. | |
| 7,270,473 B2 | 9/2007 | Donthnier et al. | |
| 7,275,666 B2 | 10/2007 | Rukavina et al. | |
| 7,278,276 B2 | 10/2007 | Boyer et al. | |
| 7,278,555 B2 | 10/2007 | McGill | |
| 7,393,690 B2 | 7/2008 | Sukavaneshvar et al. | |
| 7,451,613 B2 | 11/2008 | Barraclough et al. | |
| 7,543,717 B2 | 6/2009 | Hinkle | |
| 7,547,135 B2 | 6/2009 | Kocienski | |
| 7,587,972 B2 | 9/2009 | Katz et al. | |
| 7,603,870 B2 | 10/2009 | Mavridis et al. | |
| 7,607,821 B2 | 10/2009 | Schmidt | |
| 7,647,782 B2 | 1/2010 | Bucceri | |
| 7,648,264 B2 | 1/2010 | Breviere et al. | |
| 7,698,899 B2 | 4/2010 | Lewitus et al. | |
| 7,712,321 B2 | 5/2010 | Kadyk | |
| 7,726,136 B2 | 6/2010 | Baxter et al. | |
| 7,754,266 B2 | 7/2010 | Waletzko et al. | |
| 7,870,749 B2 | 1/2011 | Franck et al. | |
| 7,878,702 B2 | 2/2011 | Peng | |
| 7,908,871 B2 | 3/2011 | Baxter et al. | |
| 7,942,094 B2 | 5/2011 | Kounlavong et al. | |
| 8,016,168 B2 | 9/2011 | Goulet | |
| 8,123,075 B2 | 2/2012 | Kadyk | |
| 8,157,435 B2 | 4/2012 | Pryor, Jr. | |
| 8,289,514 B2 | 10/2012 | Sukavaneshvar et al. | |
| 8,297,182 B2 | 10/2012 | Cocchi et al. | |
| 8,323,015 B2 | 12/2012 | Day et al. | |
| 8,434,319 B2 | 5/2013 | Klier et al. | |
| 8,459,043 B2 | 6/2013 | Bertone | |
| 8,479,532 B2 | 7/2013 | Cocchi et al. | |

(56) References Cited

U.S. PATENT DOCUMENTS

| | | |
|---|---|---|
| 8,485,393 B2 | 7/2013 | Van Zeeland |
| 8,550,695 B2 | 10/2013 | Conti |
| 8,561,839 B2 | 10/2013 | Cocchi et al. |
| 8,572,998 B2 | 11/2013 | Cocchi et al. |
| 8,584,897 B2 | 11/2013 | Belcham |
| 8,591,097 B2 | 11/2013 | Cocchi et al. |
| 8,616,250 B2 | 12/2013 | Herbert |
| 8,685,477 B2 | 4/2014 | Almblad et al. |
| 8,701,435 B2 | 4/2014 | Gist et al. |
| 8,769,973 B2 | 7/2014 | Leaver et al. |
| 8,770,093 B2 | 7/2014 | Cahen et al. |
| 8,876,366 B2 | 11/2014 | Saubert |
| 8,887,522 B2 | 11/2014 | Grampassi |
| 8,899,063 B2 | 12/2014 | Ugolini |
| 8,998,037 B2 | 4/2015 | Cahen et al. |
| 9,016,077 B2 | 4/2015 | Cho et al. |
| 9,066,529 B2 | 6/2015 | Fassberg et al. |
| 9,089,821 B2 | 7/2015 | Seidler et al. |
| 9,127,881 B2 | 9/2015 | Anderson et al. |
| 9,131,709 B2 | 9/2015 | Hammonds et al. |
| 9,198,536 B2 | 12/2015 | Lardelli et al. |
| 9,233,829 B2 | 1/2016 | Grampassi |
| 9,301,537 B2 | 4/2016 | Cocchi et al. |
| 9,314,043 B2 | 4/2016 | Grampassi |
| 9,326,529 B2 | 5/2016 | Sipp et al. |
| 9,326,530 B2 | 5/2016 | Ugolini |
| 9,326,531 B1 | 5/2016 | Reich et al. |
| 9,328,948 B2 | 5/2016 | Billman et al. |
| 9,364,114 B2 | 6/2016 | Claesson et al. |
| 9,398,774 B2 | 7/2016 | Grampassi |
| 9,402,408 B2 | 8/2016 | Cocchi et al. |
| 9,420,915 B2 | 8/2016 | Dickson, Jr. et al. |
| 9,457,386 B2 | 10/2016 | Gates et al. |
| 9,462,826 B2 | 10/2016 | Cocchi et al. |
| 9,528,740 B1 | 12/2016 | Gist et al. |
| 9,565,868 B2 | 2/2017 | D'Agostino |
| 9,591,871 B2 | 3/2017 | Ugolini |
| 9,648,896 B2 | 5/2017 | Ugolini |
| 9,656,227 B2 | 5/2017 | Paget |
| 9,681,778 B2 | 6/2017 | Pendleton et al. |
| 9,723,857 B2 | 8/2017 | Endo et al. |
| 9,725,228 B2 | 8/2017 | Py et al. |
| 9,763,462 B2 | 9/2017 | He et al. |
| 9,765,891 B2 | 9/2017 | Bischel |
| 9,833,109 B2 | 12/2017 | Farrell et al. |
| 9,845,982 B2 | 12/2017 | Knatt |
| 9,854,820 B2 | 1/2018 | Cocchi et al. |
| 9,867,387 B2 | 1/2018 | Davis et al. |
| 9,894,912 B2 | 2/2018 | Jacobsen et al. |
| 9,895,028 B2 | 2/2018 | Gerard et al. |
| 9,986,748 B2 | 6/2018 | Lazzarini et al. |
| 9,993,016 B1 | 6/2018 | Dyer |
| 10,004,250 B2 | 6/2018 | Ugolini |
| 10,039,297 B2 | 8/2018 | Grampassi |
| 10,039,298 B2 | 8/2018 | Noth et al. |
| 10,094,607 B2 | 10/2018 | Broadbent |
| 10,123,551 B2 | 11/2018 | Beth Halachmi |
| 10,137,032 B2 | 11/2018 | Williamson et al. |
| 10,151,523 B2 | 12/2018 | Sadot et al. |
| 10,159,270 B2 | 12/2018 | Cocchi et al. |
| 10,238,129 B2 | 3/2019 | Cocchi et al. |
| 10,306,905 B2 | 6/2019 | Cocchi |
| 10,306,906 B2 | 6/2019 | Elsom et al. |
| 10,321,700 B2 | 6/2019 | Cocchi et al. |
| 10,327,455 B2 | 6/2019 | Gates |
| 10,334,868 B2 | 7/2019 | Fonte |
| 10,357,131 B2 | 7/2019 | Dickson, Jr. et al. |
| 10,375,973 B2 | 8/2019 | Noth et al. |
| 10,405,562 B2 | 9/2019 | Cocchi et al. |
| 10,463,059 B2 | 11/2019 | Bush |
| 10,477,878 B2 | 11/2019 | Cocchi et al. |
| 10,492,513 B1 | 12/2019 | Sullivan |
| 10,548,336 B2 | 2/2020 | Tuchrelo et al. |
| 10,555,545 B2 | 2/2020 | Bischel |
| 10,570,897 B2 | 2/2020 | Cocchi et al. |
| 10,571,041 B2 | 2/2020 | Bischel |
| 10,588,330 B2 | 3/2020 | Cocchi et al. |
| 10,624,364 B2 | 4/2020 | Cocchi et al. |
| 10,638,774 B2 | 5/2020 | Grampassi |
| 10,645,947 B2 | 5/2020 | Versteeg et al. |
| 10,660,348 B2 | 5/2020 | Cheung |
| 10,660,349 B2 | 5/2020 | Cocchi et al. |
| 10,674,743 B2 | 6/2020 | Ugolini |
| 10,674,744 B2 | 6/2020 | Cocchi et al. |
| 10,712,063 B2 | 7/2020 | Cobabe et al. |
| 10,712,087 B2 | 7/2020 | Cui et al. |
| 10,712,094 B2 | 7/2020 | Cocchi et al. |
| 10,721,944 B2 | 7/2020 | Dong et al. |
| 10,736,336 B2 | 8/2020 | Cocchi et al. |
| 10,736,337 B2 | 8/2020 | Seiler et al. |
| 10,743,563 B2 | 8/2020 | Mohammed et al. |
| 10,788,246 B2 | 9/2020 | Frank et al. |
| 10,806,163 B2 | 10/2020 | Dong et al. |
| 10,856,697 B2 | 12/2020 | Boozer et al. |
| 10,865,459 B2 | 12/2020 | Latva-Kokko |
| 10,894,705 B2 | 1/2021 | Cocchi et al. |
| 10,952,455 B2 | 3/2021 | Cocchi et al. |
| 10,952,456 B2 | 3/2021 | Cocchi et al. |
| 11,027,300 B2 | 6/2021 | Crossdale et al. |
| 11,051,531 B2 | 7/2021 | Cocchi et al. |
| 11,064,715 B2 | 7/2021 | Herbert et al. |
| 11,118,841 B2 | 9/2021 | Minard |
| 11,122,816 B2 | 9/2021 | Yang et al. |
| 11,134,703 B2 | 10/2021 | Cocchi et al. |
| 11,140,911 B2 | 10/2021 | Cocchi et al. |
| 11,147,289 B2 | 10/2021 | San Miguel et al. |
| 11,154,074 B2 | 10/2021 | Greenberg et al. |
| 11,154,163 B1 | 10/2021 | He et al. |
| 11,185,091 B2 | 11/2021 | Koehl et al. |
| 11,187,443 B2 | 11/2021 | Cocchi et al. |
| 11,213,046 B2 | 1/2022 | Cocchi et al. |
| 11,278,040 B2 | 3/2022 | Newton et al. |
| 11,291,218 B2 | 4/2022 | Soffientini et al. |
| 11,337,549 B2 | 5/2022 | Tuchrelo et al. |
| 11,344,045 B2 | 5/2022 | Tuchrelo et al. |
| 11,399,552 B2 | 8/2022 | Cocchi et al. |
| 11,406,119 B2 | 8/2022 | Cocchi et al. |
| 11,412,757 B2 | 8/2022 | Velez et al. |
| 11,412,884 B2 | 8/2022 | Herbert et al. |
| 11,470,855 B2 | 10/2022 | Fonte et al. |
| 11,484,042 B2 | 11/2022 | Cocchi et al. |
| 11,490,635 B2 | 11/2022 | Dong |
| 11,497,228 B2 | 11/2022 | Wadle et al. |
| 11,503,841 B2 | 11/2022 | Fonte et al. |
| 11,510,421 B2 | 11/2022 | Yifrach |
| 11,519,650 B2 | 12/2022 | Rupp |
| 11,528,922 B2 | 12/2022 | Beth Halachmi |
| RE49,350 E | 1/2023 | Barniol Gutierrez et al. |
| 11,540,533 B2 | 1/2023 | Cocchi et al. |
| 11,571,006 B2 | 2/2023 | Luca et al. |
| 11,576,398 B2 | 2/2023 | Tassi et al. |
| 11,582,985 B2 | 2/2023 | Cocchi et al. |
| 11,590,466 B2 | 2/2023 | Charopoulos et al. |
| 11,627,747 B2 | 4/2023 | Fonte et al. |
| 11,634,312 B2 | 4/2023 | Fonte et al. |
| 11,643,321 B2 | 5/2023 | Bush et al. |
| 11,696,589 B2 | 7/2023 | Cocchi et al. |
| 11,751,582 B2 | 9/2023 | Lazzarini et al. |
| 11,758,920 B1 | 9/2023 | Frank et al. |
| 11,771,108 B2 | 10/2023 | Lazzarini et al. |
| 11,805,789 B2 | 11/2023 | Springer et al. |
| 11,963,638 B2 | 4/2024 | Eissengarthen et al. |
| 2001/0052239 A1 | 12/2001 | Dorner |
| 2002/0162339 A1 | 11/2002 | Harrison et al. |
| 2003/0000240 A1 | 1/2003 | Pahl |
| 2003/0080644 A1 | 5/2003 | Nelson et al. |
| 2003/0142581 A1 | 7/2003 | Barton et al. |
| 2003/0192325 A1 | 10/2003 | Cocchi et al. |
| 2003/0227817 A1 | 12/2003 | Martel et al. |
| 2004/0187514 A1 | 9/2004 | Franck et al. |
| 2004/0226305 A1 | 11/2004 | Grampassi |
| 2006/0043088 A1 | 3/2006 | Ancona et al. |
| 2006/0044935 A1 | 3/2006 | Benelli et al. |
| 2006/0156754 A1 | 7/2006 | Liu |

(56) References Cited

U.S. PATENT DOCUMENTS

| | | |
|---|---|---|
| 2006/0169147 A1 | 8/2006 | Cocchi et al. |
| 2006/0169727 A1 | 8/2006 | Cocchi et al. |
| 2006/0196366 A1 | 9/2006 | Jeuch |
| 2006/0213903 A1 | 9/2006 | Lin |
| 2007/0119867 A1 | 5/2007 | Nakato et al. |
| 2007/0151101 A1 | 7/2007 | Cocchi et al. |
| 2008/0073376 A1 | 3/2008 | Gist et al. |
| 2008/0098765 A1 | 5/2008 | Bond |
| 2008/0149655 A1 | 6/2008 | Gist et al. |
| 2008/0202130 A1 | 8/2008 | Kadyk |
| 2008/0282722 A1 | 11/2008 | Edmonds et al. |
| 2009/0052143 A1 | 2/2009 | Chiu |
| 2009/0127295 A1 | 5/2009 | Cocchi et al. |
| 2009/0139257 A1 | 6/2009 | Cocchi et al. |
| 2010/0004109 A1 | 1/2010 | Ballhause |
| 2010/0050655 A1 | 3/2010 | Bravo et al. |
| 2010/0116846 A1 | 5/2010 | Cortese et al. |
| 2010/0147875 A1 | 6/2010 | Santos et al. |
| 2010/0293965 A1 | 11/2010 | Frank et al. |
| 2011/0101039 A1 | 5/2011 | Cocchi et al. |
| 2011/0262600 A1 | 10/2011 | McGill |
| 2012/0096876 A1 | 4/2012 | Ravji et al. |
| 2012/0223094 A1 | 9/2012 | Rickard, Jr. et al. |
| 2012/0298690 A1 | 11/2012 | Skobel et al. |
| 2012/0312049 A1 | 12/2012 | Downs, III et al. |
| 2013/0077433 A1 | 3/2013 | Conti |
| 2013/0098098 A1 | 4/2013 | Ugolini |
| 2013/0263747 A1 | 10/2013 | Ugolini |
| 2014/0043931 A1 | 2/2014 | Figueroa |
| 2014/0134299 A1 | 5/2014 | Guidorzi et al. |
| 2014/0209635 A1 | 7/2014 | Gates et al. |
| 2014/0212566 A1 | 7/2014 | Herbert et al. |
| 2014/0263340 A1 | 9/2014 | Audette |
| 2014/0263415 A1 | 9/2014 | San Miguel et al. |
| 2015/0150408 A1 | 6/2015 | Schlee |
| 2015/0191685 A1 | 7/2015 | Kyle |
| 2015/0245636 A1 | 9/2015 | Forrester, Jr. |
| 2015/0264959 A1 | 9/2015 | Colwell et al. |
| 2016/0015217 A1 | 1/2016 | Rojas Restrepo et al. |
| 2016/0016129 A1 | 1/2016 | Vermeulen et al. |
| 2016/0262422 A1 | 9/2016 | Biglari et al. |
| 2016/0353766 A1 | 12/2016 | Jacobsen et al. |
| 2017/0027188 A1 | 2/2017 | Raybin et al. |
| 2017/0160007 A1 | 6/2017 | Liptak et al. |
| 2017/0304784 A1 | 10/2017 | Kasprzycki |
| 2017/0332658 A1 | 11/2017 | Mitchell et al. |
| 2017/0367370 A1 | 12/2017 | Frisque et al. |
| 2018/0014553 A1 | 1/2018 | Ugolini |
| 2018/0020875 A1 | 1/2018 | Kolar et al. |
| 2018/0184682 A1 | 7/2018 | Bertone |
| 2018/0206519 A1 | 7/2018 | Noth et al. |
| 2018/0216875 A1 | 8/2018 | Caswell et al. |
| 2018/0228180 A1 | 8/2018 | Cocchi et al. |
| 2018/0231318 A1 | 8/2018 | Cocchi et al. |
| 2019/0056182 A1 | 2/2019 | Bischel et al. |
| 2019/0070643 A1 | 3/2019 | Wong et al. |
| 2019/0110496 A1 | 4/2019 | Cocchi et al. |
| 2019/0124944 A1 | 5/2019 | Caiano |
| 2019/0125122 A1 | 5/2019 | Feola |
| 2019/0166873 A1 | 6/2019 | Grampassi |
| 2019/0313664 A1 | 10/2019 | Haas et al. |
| 2019/0337791 A1* | 11/2019 | Bush .................... B67D 99/00 |
| 2019/0357562 A1 | 11/2019 | San Miguel et al. |
| 2020/0107559 A1 | 4/2020 | Deshpande et al. |
| 2020/0156019 A1 | 5/2020 | Sawyer et al. |
| 2020/0173697 A1 | 6/2020 | Resnick |
| 2020/0288746 A1 | 9/2020 | Luca et al. |
| 2020/0288747 A1 | 9/2020 | Greenberg et al. |
| 2020/0339407 A1 | 10/2020 | Caiano |
| 2021/0000133 A1 | 1/2021 | Meldrum et al. |
| 2021/0003549 A1 | 1/2021 | Ino et al. |
| 2021/0022364 A1 | 1/2021 | Meldrum et al. |
| 2021/0084930 A1 | 3/2021 | Fonte |
| 2021/0085129 A1 | 3/2021 | Boozer et al. |
| 2021/0152649 A1 | 5/2021 | Ciepiel |
| 2021/0161182 A1 | 6/2021 | Stoenescu et al. |
| 2021/0186267 A1 | 6/2021 | Hammond et al. |
| 2021/0354100 A1 | 11/2021 | Sapire et al. |
| 2021/0360979 A1 | 11/2021 | Leb et al. |
| 2021/0368821 A1 | 12/2021 | Tassi et al. |
| 2021/0371265 A1 | 12/2021 | Fonte et al. |
| 2022/0001344 A1 | 1/2022 | Zdanow et al. |
| 2022/0030906 A1 | 2/2022 | Springer et al. |
| 2022/0073336 A1 | 3/2022 | Savioz |
| 2022/0087284 A1 | 3/2022 | Savioz |
| 2022/0110339 A1 | 4/2022 | Beth Halachmi et al. |
| 2022/0117255 A1 | 4/2022 | Lazzarini et al. |
| 2022/0117256 A1 | 4/2022 | Wang |
| 2022/0174978 A1 | 6/2022 | Douer |
| 2022/0205712 A1 | 6/2022 | Fonte |
| 2022/0211072 A1 | 7/2022 | Tran et al. |
| 2022/0225636 A1 | 7/2022 | Minard et al. |
| 2022/0240533 A1 | 8/2022 | Dees et al. |
| 2022/0273141 A1 | 9/2022 | Atinaja |
| 2022/0295822 A1 | 9/2022 | Lazzarini et al. |
| 2022/0394996 A1 | 12/2022 | Lazzarini et al. |
| 2023/0000289 A1 | 1/2023 | Kolar et al. |
| 2023/0038281 A1 | 2/2023 | Gee, II et al. |
| 2023/0040750 A1 | 2/2023 | Ciepiel et al. |
| 2023/0055322 A1 | 2/2023 | Griffiths et al. |
| 2023/0074503 A1 | 3/2023 | Kanellos et al. |
| 2023/0107530 A1 | 4/2023 | Kadyk et al. |
| 2023/0180785 A1 | 6/2023 | Feola |
| 2023/0292785 A1 | 9/2023 | Collins et al. |
| 2023/0413851 A1 | 12/2023 | Resnick et al. |
| 2024/0074453 A1 | 3/2024 | Herbert et al. |
| 2024/0292979 A1 | 9/2024 | Weinstock et al. |
| 2024/0292980 A1 | 9/2024 | Weinstock et al. |

FOREIGN PATENT DOCUMENTS

| | | |
|---|---|---|
| CN | 2681650 Y | 3/2005 |
| CN | 2719037 Y | 8/2005 |
| CN | 101035719 B | 9/2010 |
| CN | 101897379 A | 12/2010 |
| CN | 101953631 A | 1/2011 |
| CN | 102395280 A | 3/2012 |
| CN | 1981590 B | 7/2012 |
| CN | 202287939 U | 7/2012 |
| CN | 101073373 B | 9/2012 |
| CN | 102869269 A | 1/2013 |
| CN | 101433257 B | 3/2013 |
| CN | 202773994 U | 3/2013 |
| CN | 101263838 B | 6/2013 |
| CN | 203194450 U | 9/2013 |
| CN | 101842022 B | 5/2014 |
| CN | 102802432 B | 9/2014 |
| CN | 104222447 A | 12/2014 |
| CN | 102791142 B | 2/2015 |
| CN | 103052324 B | 2/2015 |
| CN | 104351455 A | 2/2015 |
| CN | 104839419 A | 8/2015 |
| CN | 103727718 B | 5/2016 |
| CN | 104146140 B | 6/2016 |
| CN | 105685363 A | 6/2016 |
| CN | 105767441 A | 7/2016 |
| CN | 105876067 A | 8/2016 |
| CN | 104349681 B | 12/2016 |
| CN | 106472801 A | 3/2017 |
| CN | 106472802 A | 3/2017 |
| CN | 103619187 B | 5/2017 |
| CN | 103796562 B | 5/2017 |
| CN | 106720895 A | 5/2017 |
| CN | 106720899 A | 5/2017 |
| CN | 206137910 U | 5/2017 |
| CN | 103190521 B | 6/2017 |
| CN | 106900971 A | 6/2017 |
| CN | 106998739 A | 8/2017 |
| CN | 206480820 U | 9/2017 |
| CN | 105636681 B | 2/2018 |
| CN | 105928284 B | 3/2018 |
| CN | 107799959 A | 3/2018 |
| CN | 108471774 A | 8/2018 |
| CN | 108967640 A | 12/2018 |

(56) References Cited

FOREIGN PATENT DOCUMENTS

| | | | |
|---|---|---|---|
| CN | 109068679 A | 12/2018 |
| CN | 109152386 A | 1/2019 |
| CN | 305037389 S | 2/2019 |
| CN | 109497252 A | 3/2019 |
| CN | 305239624 S | 7/2019 |
| CN | 106414244 B | 8/2019 |
| CN | 110168296 A | 8/2019 |
| CN | 105142417 B | 10/2019 |
| CN | 105517448 B | 11/2019 |
| CN | 110432373 A | 11/2019 |
| CN | 110477182 A | 11/2019 |
| CN | 104782875 B | 12/2019 |
| CN | 105992518 B | 12/2019 |
| CN | 110573023 A | 12/2019 |
| CN | 110604206 A | 12/2019 |
| CN | 104543313 B | 3/2020 |
| CN | 111011572 A | 4/2020 |
| CN | 111096388 A | 5/2020 |
| CN | 111386045 A | 7/2020 |
| CN | 111887338 A | 11/2020 |
| CN | 111903828 A | 11/2020 |
| CN | 111918557 A | 11/2020 |
| CN | 111918558 A | 11/2020 |
| CN | 112262910 A | 1/2021 |
| CN | 105767440 B | 3/2021 |
| CN | 105795089 B | 3/2021 |
| CN | 212872077 U | 4/2021 |
| CN | 111609640 B | 5/2021 |
| CN | 213095924 U | 5/2021 |
| CN | 106562677 B | 6/2021 |
| CN | 112911941 A | 6/2021 |
| CN | 105028886 B | 7/2021 |
| CN | 105580972 B | 7/2021 |
| CN | 109689530 B | 9/2021 |
| CN | 214223471 U | 9/2021 |
| CN | 214284224 U | 9/2021 |
| CN | 306833593 S | 9/2021 |
| CN | 106234750 B | 10/2021 |
| CN | 107279447 B | 10/2021 |
| CN | 113483505 A | 10/2021 |
| CN | 214316889 U | 10/2021 |
| CN | 214841943 U | 11/2021 |
| CN | 113729494 A | 12/2021 |
| CN | 113776237 A | 12/2021 |
| CN | 215176200 U | 12/2021 |
| CN | 113892544 A | 1/2022 |
| CN | 113892551 A | 1/2022 |
| CN | 113907172 A | 1/2022 |
| CN | 113925109 A | 1/2022 |
| CN | 216088684 U | 3/2022 |
| CN | 108471775 B | 5/2022 |
| CN | 114424796 A | 5/2022 |
| CN | 114760847 A | 7/2022 |
| CN | 114760848 A | 7/2022 |
| CN | 216906702 U | 7/2022 |
| CN | 114868828 A | 8/2022 |
| CN | 114870688 A | 8/2022 |
| CN | 217284664 U | 8/2022 |
| CN | 115348822 A | 11/2022 |
| CN | 115397250 A | 11/2022 |
| CN | 108402274 B | 12/2022 |
| CN | 218495421 U | 2/2023 |
| CN | 109414034 B | 3/2023 |
| CN | 109463523 B | 3/2023 |
| CN | 107788200 B | 6/2023 |
| CN | 109090329 B | 6/2023 |
| CN | 110269127 B | 7/2023 |
| CN | 116473154 B | 7/2023 |
| CN | 113892548 B | 8/2023 |
| CN | 113925107 B | 8/2023 |
| CN | 113892544 B | 9/2023 |
| CN | 113728208 B | 10/2023 |
| CN | 114009573 B | 10/2023 |
| CN | 114009574 B | 10/2023 |
| CN | 220287817 U | 1/2024 |
| CN | 308416570 S | 1/2024 |
| CN | 308422196 S | 1/2024 |
| CN | 117928143 A | 4/2024 |
| CN | 117958344 A | 5/2024 |
| CN | 221059481 U | 6/2024 |
| CN | 308671658 S | 6/2024 |
| CN | 118383446 A | 7/2024 |
| CN | 118383447 A | 7/2024 |
| CN | 118383448 A | 7/2024 |
| CN | 308729489 S | 7/2024 |
| CN | 118415268 A | 8/2024 |
| CN | 118442732 A | 8/2024 |
| CN | 118463436 A | 8/2024 |
| CN | 118489792 A | 8/2024 |
| CN | 118645963 A | 9/2024 |
| CN | 221881850 U | 10/2024 |
| CN | 118873002 A | 11/2024 |
| CN | 118912748 A | 11/2024 |
| CN | 118949740 A | 11/2024 |
| CN | 119097039 A | 12/2024 |
| CN | 119111683 A | 12/2024 |
| CN | 222278939 U | 12/2024 |
| CN | 119344398 A | 1/2025 |
| DE | 1981857 U | 3/1968 |
| DE | 2225460 | 12/1973 |
| DE | 19701379 A1 | 6/1998 |
| DE | 102016219197 A1 | 4/2018 |
| EM | 001766817 | 10/2010 |
| EP | 0022090 A2 | 1/1981 |
| EP | 0133844 A1 | 3/1985 |
| EP | 0250245 B1 | 3/1991 |
| EP | 0793535 B1 | 6/1999 |
| EP | 0861597 A3 | 11/1999 |
| EP | 0827480 B1 | 9/2002 |
| EP | 0876765 B1 | 10/2002 |
| EP | 0910269 B1 | 10/2002 |
| EP | 1132007 A3 | 9/2003 |
| EP | 0893070 B1 | 9/2005 |
| EP | 1787526 A1 | 5/2007 |
| EP | 1808622 A1 | 7/2007 |
| EP | 1635682 B1 | 8/2007 |
| EP | 1787524 A3 | 11/2008 |
| EP | 1738652 B1 | 5/2009 |
| EP | 2266416 A1 | 12/2010 |
| EP | 2332450 A1 | 6/2011 |
| EP | 1980156 B1 | 6/2012 |
| EP | 2062481 B1 | 6/2012 |
| EP | 2342997 B1 | 6/2012 |
| EP | 2478774 A1 | 7/2012 |
| EP | 2064957 B1 | 1/2013 |
| EP | 2446750 B1 | 1/2013 |
| EP | 2578119 A1 | 4/2013 |
| EP | 2267340 B1 | 3/2014 |
| EP | 2613643 B1 | 4/2014 |
| EP | 2508080 B1 | 5/2015 |
| EP | 2708169 B1 | 6/2015 |
| EP | 2680708 B1 | 1/2016 |
| EP | 2550869 B1 | 2/2017 |
| EP | 2805620 B1 | 2/2017 |
| EP | 2269469 B1 | 4/2017 |
| EP | 2277386 B1 | 4/2017 |
| EP | 2713765 B1 | 8/2017 |
| EP | 2653808 A3 | 1/2018 |
| EP | 2863777 B1 | 6/2018 |
| EP | 3348516 A1 | 7/2018 |
| EP | 3360422 A1 | 8/2018 |
| EP | 3172970 B1 | 1/2019 |
| EP | 3399865 B1 | 7/2019 |
| EP | 3324804 B1 | 3/2020 |
| EP | 3245430 B1 | 5/2020 |
| EP | 3669661 A1 | 6/2020 |
| EP | 3351113 B1 | 12/2020 |
| EP | 3340844 B1 | 10/2022 |
| EP | 3473950 B1 | 3/2023 |
| EP | 3519347 B1 | 3/2023 |
| EP | 3554252 B1 | 5/2023 |
| EP | 3793416 B1 | 5/2023 |
| EP | 3616528 B1 | 7/2023 |
| FR | 2574253 B1 | 2/1990 |

(56) References Cited

FOREIGN PATENT DOCUMENTS

| | | |
|---|---|---|
| FR | 2705550 A1 | 12/1994 |
| GB | 1183551 | 3/1970 |
| GB | 2444979 B | 6/2008 |
| IT | 102010901894460 | 5/2012 |
| IT | 102019000002923 | 8/2020 |
| JP | H11113498 A | 4/1999 |
| JP | H11299429 A | 11/1999 |
| JP | 2001169730 A | 6/2001 |
| KR | 9761081 A | 9/1997 |
| KR | 100214695 B1 | 8/1999 |
| WO | 0125673 A1 | 4/2001 |
| WO | 0197628 A1 | 12/2001 |
| WO | 2004054380 A1 | 7/2004 |
| WO | 2008001520 A1 | 1/2008 |
| WO | 2008119980 A1 | 10/2008 |
| WO | 2011081301 A2 | 7/2011 |
| WO | 2014123842 A1 | 8/2014 |
| WO | 2015063094 A1 | 5/2015 |
| WO | 2016069106 A1 | 5/2016 |
| WO | 2019057130 A1 | 3/2019 |
| WO | 2020163551 A1 | 8/2020 |
| WO | 2020191221 A1 | 9/2020 |
| WO | 2021009788 A1 | 1/2021 |
| WO | 2021250682 A1 | 12/2021 |
| WO | 2022205902 A1 | 10/2022 |
| WO | 2023042084 A1 | 3/2023 |
| WO | 2023091416 A3 | 5/2023 |
| WO | 2023131944 A1 | 7/2023 |
| WO | 2024111011 A1 | 5/2024 |

OTHER PUBLICATIONS

Pending U.S. Appl. No. 29/943,526, filed May 22, 2024; Cameron John Auger, Joyce Chien Tu.

Pending U.S. Appl. No. 18/423,721, filed Jan. 26, 2024; Macrae Benziger, Michael Lerman, Alexander Mularski.

Pending U.S. Appl. No. 18/423,728, filed Jan. 26, 2024; Macrae Benziger, Michael Lerman, Alexander Mularski, Matthew Roberts.

Pending U.S. Appl. No. 19/071,253, filed Mar. 5, 2025; Stephanie Cugini, Elizabeth Pellegrini, Cameron John Auger, Joyce Tu, Yaoming Deng, Bing Yin, Pei Zheng, Jared James Proulx, Michael Lerman, Alexander Mularski, Macrae Benziger, Ryan Michienzi.

Pending U.S. Appl. No. 18/415,817, filed Jan. 18, 2024; Michael Lerman, Macrae Benziger, Alexander Mularski, Ryan Michienzi, Vipul Mone.

Pending U.S. Appl. No. 18/423,899, filed Jan. 26, 2024; Michael Lerman, Macrae Benziger, Alexander Mularski, Vipul Mone.

Pending U.S. Appl. No. 18/423,906, filed Jan. 26, 2024; Michael Lerman, Macrae Benziger, Ryan Michienzi.

Pending U.S. Appl. No. 18/424,517, filed Jan. 26, 2024; Michael Lerman, Macrae Benziger, Alexander Mularski, Derek Lessard.

Pending U.S. Appl. No. 18/424,530, filed Jan. 26, 2024; Michael Lerman, Macrae Benziger, Alexander Mularski, Vipul Mone.

Pending U.S. Appl. No. 18/658,434, filed May 8, 2024; Michael Lerman, Jennifer Andrews, Alexander Mularski.

Pending U.S. Appl. No. 18/816,489, filed Aug. 27, 2024; Michael Lerman, Macrae Benziger, Alexander Mularski, Vipul Mone.

Pending U.S. Appl. No. 18/817,411, filed Aug. 28, 2024; Michael Lerman, Vipul Mone.

Pending U.S. Appl. No. 18/817,424, filed Aug. 28, 2024; Michael Lerman, Vipul Mone.

Pending U.S. Appl. No. 18/817,476, filed Aug. 28, 2024; Michael Lerman, Alexander Mularski, Jared James Proulx, Vipul Mone, Macrae Benziger.

Pending U.S. Appl. No. 29/944,388, filed May 28, 2024; Michael Lerman, Alexander Mularski, Macrae Benziger, Yaoming Deng, Pei Zheng, Bing Yin.

Pending U.S. Appl. No. 63/669,144, filed Jul. 9, 2024; Michael Lerman, Jared James Proulx, Vipul Mone.

Pending U.S. Appl. No. 18/424,536, filed Jan. 26, 2024; Derek Lessard, Michael Lerman, Lloyd Olson, Ryan Michienzi.

Pending U.S. Appl. No. 18/426,942, filed Jan. 30, 2024; Derek Lessard, Michael Lerman, Lloyd Olson, Ryan Michienzi.

Pending U.S. Appl. No. 18/423,894, filed Jan. 26, 2024; Matthew Roberts, Michael Lerman, Macrae Benziger, Alexander Mularski.

Pending U.S. Appl. No. 18/816,401, filed Aug. 27, 2024; Matthew Roberts, Michael Lerman, Macrae Benziger, Alexander Mularski.

Pending U.S. Appl. No. 19/071,024, filed Mar. 5, 2025; Matthew Roberts, Michael Lerman, Macrae Benziger, Alexander Mularski.

Complaint For Declaratory Judgment, *Foshan Macjerry Technology Co., Ltd.* v. *SharkNinja Operating LLC*, No. 2:25-cv-00954 (W.D. Wash. May 19, 2025) 59 pages.

Complaint For Declaratory Judgment, *Shenzhen Tao Yi An E-Commerce Co., Ltd.* v. *SharkNinja Operating LLC*, No. 5:25-cv-04656 (N.D. Cal. Jun. 3, 2025) 13 pages.

Answer and Affirmative Defenses to Counterclaims, *Foshan Macjerry Technology Co., Ltd.* v. *SharkNinja Operating LLC*, No. 2:25-cv-00954 (W.D. Wash. Jul. 11, 2025) 14 pages.

Answer and Counterclaims, *SharkNinja Operating LLC* v. *RJ Brands, LLC*, No. 1:25-cv-05650 (D.N.J. Aug. 11, 2025) 37 pages.

* cited by examiner

_FEATURE FOR PREVENTING MATERIAL BUILDUP IN A MIXING VESSEL OF A DRINK MAKER_

TECHNICAL FIELD

The present disclosure relates to a drink maker and, more particularly, to a frozen drink maker including at least one internal feature to control movement and/or positioning of slush within the mixing vessel during processing.

BACKGROUND

Frozen drink makers, which may also be referred to as semi-frozen beverage makers, or crushed-ice drink makers, typically include a transparent tank or mixing vessel in which a drink product is received and processed, including being cooled, often transforming the drink product from a pure liquid (or a combination of a liquid and portions of ice) to a frozen or semi-frozen product, such as, for example, a granita, slush drink, smoothie, ice cream, or other frozen or semi-frozen product, which is then dispensed. The cooled product is typically dispensed through a tap, spigot or dispenser located at the front and near the bottom of the vessel. Thus, the term "frozen drink maker" as used herein is not limited to a device that only makes drinks or frozen drinks but includes devices that cool received drink products to produce cooled outputs in any of a variety of frozen and semi-frozen forms. A drink product typically consists of a mixture of water or milk, a syrup, flavoring powders, or other additives that give the drink product the desired taste and color.

Some existing frozen drink makers include a mixing system within the mixing vessel having a mixing utensil that is rotated by a motor via a drive shaft and drive assembly. Some existing frozen drink makers include a refrigeration system having a compressor, a condenser and an evaporator (i.e., chiller) for receiving refrigerant from the compressor where the evaporator is located adjacent to or within the mixing vessel to cool the drink product during processing.

Some existing frozen drink makers include a controller that controls operations of the frozen drink maker related to making drink products, including the temperature of frozen food products during processing. However, during operation, a frozen drink maker may allow material to accumulate in undesirable locations. This may lead to unused material remaining in a mixing vessel and/or potential damage to components of the drink maker.

SUMMARY

Accordingly, provided is a frozen drink maker having at least one internal feature in a mixing vessel to control movement and/or positioning of material within the mixing vessel during processing and prevent a buildup of material at locations within the mixing vessel.

According to some non-limiting embodiments or aspects, provided is a feature for preventing material buildup in a mixing vessel of a frozen drink maker that includes at least one protrusion extending into a vessel chamber of a mixing vessel. The at least one protrusion is positioned on a central axis of a dasher that is positioned within the vessel chamber, and the at least one protrusion is sized and configured to fit into a space defined by one or more mixing blades of the dasher at a first end of the dasher.

In some non-limiting embodiments or aspects, the at least one protrusion extends from an interior wall of the mixing vessel and into the space defined by one or more mixing blades at the first end of the dasher.

In some non-limiting embodiments or aspects, the at least one protrusion extends away from the first end of the dasher and into the space defined by one or more mixing blades at the first end of the dasher.

In some non-limiting embodiments or aspects, the at least one protrusion is positioned on an interior wall of the mixing vessel and adjacent an outlet of the mixing vessel.

In some non-limiting embodiments or aspects, the at least one protrusion includes a base protruding section and a secondary protruding section that extends away from the base protruding section, and the secondary protruding section is smaller than the base protruding section.

In some non-limiting embodiments or aspects, the dasher includes a hub at the first end of the dasher, and the one or more mixing blades of the dasher includes a first mixing blade and a second mixing blade connected to the hub. The base protruding section is sized and configured to fit into a first space defined by the first mixing blade and the second mixing blade of the dasher, and the secondary protruding section is sized and configured to fit into a second space defined between the first mixing blade and the hub and between the second mixing blade and the hub.

In some non-limiting embodiments or aspects, the at least one protrusion includes a flat outer surface that faces an outer surface of the hub of the dasher.

In some non-limiting embodiments or aspects, the at least one protrusion extends away from an interior wall of the mixing vessel and into the space defined by one or more mixing blades at the first end of the dasher. The at least one protrusion includes a top edge portion and a bottom edge portion. The top edge portion has a triangular prism shape and the bottom edge portion has a hemi-spherical cylinder shape.

In some non-limiting embodiments or aspects, the at least one protrusion includes a fillet section, where the at least one protrusion meets the interior wall of the mixing vessel.

In some non-limiting embodiments or aspects, the at least one protrusion is configured to be stationary and to avoid contact with the one or more mixing blades of the dasher, as the dasher rotates within the vessel chamber of the mixing vessel.

According to some non-limiting embodiments or aspects, provided is a frozen drink maker that includes a mixing vessel having at least one curved sidewall defining a vessel chamber that is at least partly cylindrical and is configured to receive a drink product to be processed. The vessel chamber includes a front, a rear, a right side, a left side, a top, and a bottom. The frozen drink maker also includes a dasher having one or more mixing blades. The one or more mixing blades of the dasher are configured to rotate about a center axis to move the drink product within the vessel chamber, and the dasher is configured to be positioned within the mixing vessel. The frozen drink maker further includes at least one protrusion extending into the vessel chamber of the mixing vessel. The at least one protrusion is positioned on a central axis of the dasher, and the at least one protrusion is sized and configured to fit into a space defined by the one or more mixing blades of the dasher at a first end of the dasher.

In some non-limiting embodiments or aspects, the at least one protrusion extends from an interior wall of the mixing vessel and into the space defined by one or more mixing blades at the first end of the dasher.

In some non-limiting embodiments or aspects, the at least one protrusion extends away from the first end of the dasher and into the space defined by one or more mixing blades at the first end of the dasher.

In some non-limiting embodiments or aspects, the at least one protrusion is positioned on an interior wall of the mixing vessel and adjacent an outlet of the mixing vessel.

In some non-limiting embodiments or aspects, the at least one protrusion includes a base protruding section and a secondary protruding section that extends away from the base protruding section, and the secondary protruding section is smaller than the base protruding section.

In some non-limiting embodiments or aspects, the dasher includes a hub at the first end of the dasher, and the one or more mixing blades of the dasher includes a first mixing blade and a second mixing blade connected to the hub. The base protruding section is sized and configured to fit into a first space defined by the first mixing blade and the second mixing blade of the dasher, and the secondary protruding section is sized and configured to fit into a second space defined between the first mixing blade and the hub and between the second mixing blade and the hub.

In some non-limiting embodiments or aspects, the at least one protrusion includes a flat outer surface that faces an outer surface of the hub of the dasher.

In some non-limiting embodiments or aspects, the at least one protrusion extends away from an interior wall of the mixing vessel and into the space defined by one or more mixing blades at the first end of the dasher. The at least one protrusion includes a top edge portion and a bottom edge portion. The top edge portion has a triangular prism shape and the bottom edge portion has a hemi-spherical cylinder shape.

In some non-limiting embodiments or aspects, the at least one protrusion includes a fillet section, where the at least one protrusion meets the interior wall of the mixing vessel.

In some non-limiting embodiments or aspects, the at least one protrusion is configured to be stationary and to avoid contact with the one or more mixing blades of the dasher, as the dasher rotates within the vessel chamber of the mixing vessel.

Further non-limiting embodiments or aspects are set forth in the following numbered clauses:

Clause 1: A feature for preventing material buildup in a mixing vessel of a frozen drink maker, comprising: at least one protrusion extending into a vessel chamber of a mixing vessel; wherein the at least one protrusion is positioned on a central axis of a dasher that is positioned within the vessel chamber; and wherein the at least one protrusion is sized and configured to fit into a space defined by one or more mixing blades of the dasher at a first end of the dasher.

Clause 2: The feature of clause 1, wherein the at least one protrusion extends from an interior wall of the mixing vessel and into the space defined by one or more mixing blades at the first end of the dasher.

Clause 3: The feature of clause 1 or clause 2, wherein the at least one protrusion extends away from the first end of the dasher and into the space defined by one or more mixing blades at the first end of the dasher.

Clause 4: The feature of any of clauses 1-3, wherein the at least one protrusion is positioned on an interior wall of the mixing vessel and adjacent an outlet of the mixing vessel.

Clause 5: The feature of any of clauses 1-4, wherein the at least one protrusion comprises a base protruding section and a secondary protruding section that extends away from the base protruding section, and wherein the secondary protruding section is smaller than the base protruding section.

Clause 6: The feature of any of clauses 1-5, wherein the dasher comprises a hub at the first end of the dasher, wherein the one or more mixing blades of the dasher comprises a first mixing blade and a second mixing blade connected to the hub, wherein the base protruding section is sized and configured to fit into a first space defined by the first mixing blade and the second mixing blade of the dasher, and wherein the secondary protruding section is sized and configured to fit into a second space defined between the first mixing blade and the hub and between the second mixing blade and the hub.

Clause 7: The feature of any of clauses 1-6, wherein the at least one protrusion comprises a flat outer surface that faces an outer surface of the hub of the dasher.

Clause 8: The feature of any of clauses 1-7, wherein the at least one protrusion extends away from an interior wall of the mixing vessel and into the space defined by one or more mixing blades at the first end of the dasher, wherein the at least one protrusion comprises a top edge portion and a bottom edge portion, and wherein the top edge portion has a triangular prism shape and the bottom edge portion has a hemi-spherical cylinder shape.

Clause 9: The feature of any of clauses 1-8, wherein the at least one protrusion comprises a fillet section, where the at least one protrusion meets the interior wall of the mixing vessel.

Clause 10: The feature of any of clauses 1-9, wherein the at least one protrusion is configured to be stationary and to avoid contact with the one or more mixing blades of the dasher, as the dasher rotates within the vessel chamber of the mixing vessel.

Clause 11: A frozen drink maker, comprising: a mixing vessel comprising at least one curved sidewall defining a vessel chamber that is at least partly cylindrical and is configured to receive a drink product to be processed, the vessel chamber comprising: a front, a rear, a right side, a left side, a top, and a bottom; a dasher comprising one or more mixing blades, wherein the one or more mixing blades of the dasher are configured to rotate about a center axis to move the drink product within the vessel chamber, and wherein the dasher is configured to be positioned within the mixing vessel; and at least one protrusion extending into the vessel chamber of the mixing vessel, wherein the at least one protrusion is positioned on a central axis of the dasher, and wherein the at least one protrusion is sized and configured to fit into a space defined by the one or more mixing blades of the dasher at a first end of the dasher.

Clause 12: The frozen drink maker of clause 11, wherein the at least one protrusion extends from an interior wall of the mixing vessel and into the space defined by one or more mixing blades at the first end of the dasher.

Clause 13: The frozen drink maker of clause 11 or clause 12, wherein the at least one protrusion extends away from the first end of the dasher and into the space defined by one or more mixing blades at the first end of the dasher.

Clause 14: The frozen drink maker of any of clauses 11-13, wherein the at least one protrusion is positioned on an interior wall of the mixing vessel and adjacent an outlet of the mixing vessel.

Clause 15: The frozen drink maker of any of clauses 11-14, wherein the at least one protrusion comprises a base protruding section and a secondary protruding section that extends away from the base protruding section, and wherein the secondary protruding section is smaller than the base protruding section.

Clause 16: The frozen drink maker of any of clauses 11-15, wherein the dasher comprises a hub at the first end of the dasher, wherein the one or more mixing blades of the dasher comprises a first mixing blade and a second mixing blade connected to the hub, wherein the base protruding section is sized and configured to fit into a first space defined by the first mixing blade and the second mixing blade of the dasher, and wherein the secondary protruding section is sized and configured to fit into a second space defined between the first mixing blade and the hub and between the second mixing blade and the hub.

Clause 17: The frozen drink maker of any of clauses 11-16, wherein the at least one protrusion comprises a flat outer surface that faces an outer surface of the hub of the dasher.

Clause 18: The frozen drink maker of any of clauses 11-17, wherein the at least one protrusion extends away from an interior wall of the mixing vessel and into the space defined by one or more mixing blades at the first end of the dasher, wherein the at least one protrusion comprises a top edge portion and a bottom edge portion, and wherein the top edge portion has a triangular prism shape and the bottom edge portion has a hemi-spherical cylinder shape.

Clause 19: The frozen drink maker of any of clauses 11-18, wherein the at least one protrusion comprises a fillet section, where the at least one protrusion meets the interior wall of the mixing vessel.

Clause 20: The frozen drink maker of any of clauses 11-19, wherein the at least one protrusion is configured to be stationary and to avoid contact with the one or more mixing blades of the dasher, as the dasher rotates within the vessel chamber of the mixing vessel.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Reference to the detailed description, combined with the following figures, will make the disclosure more fully understood, wherein.

DETAILED DESCRIPTION

Figure 1:
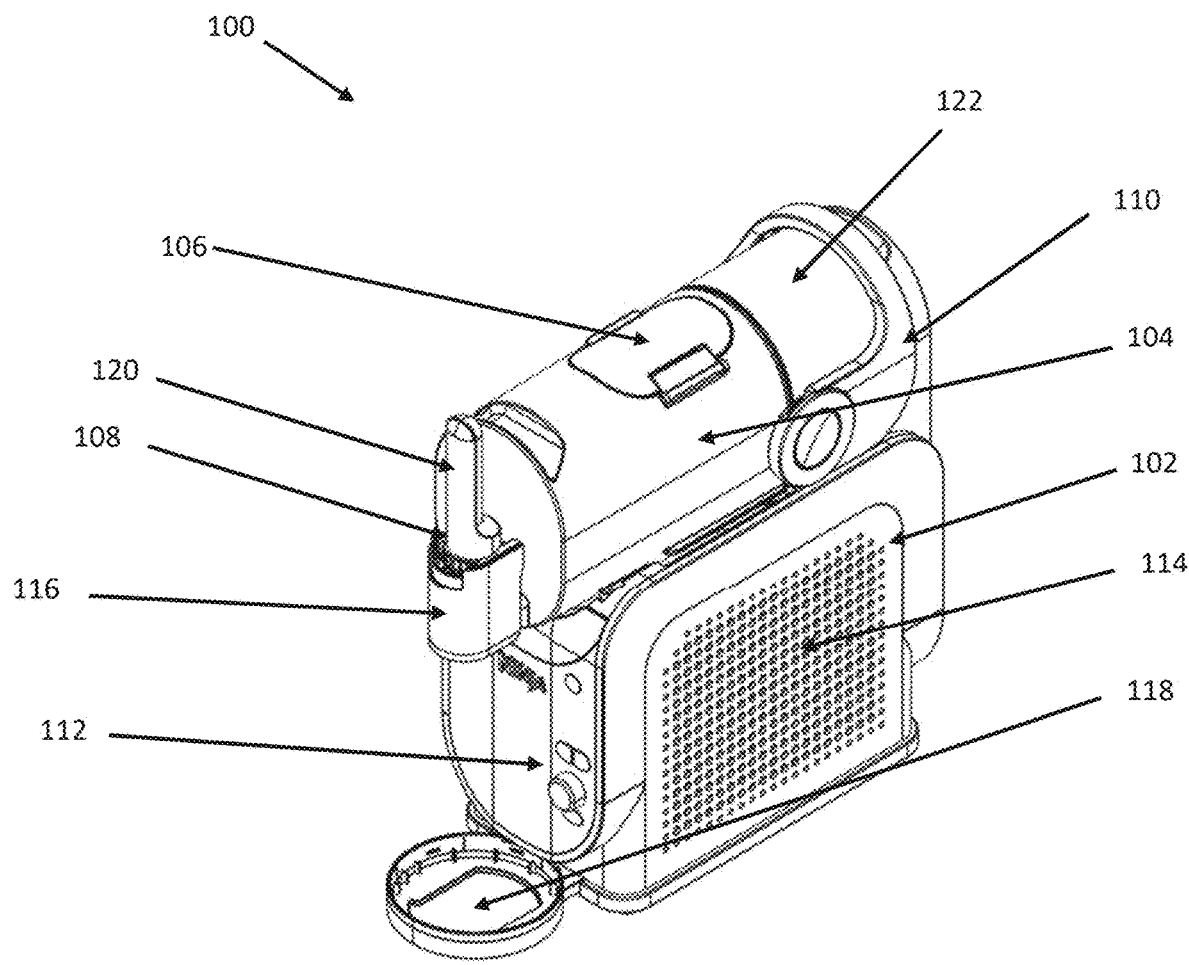
FIG. 1 shows a perspective view of a frozen drink maker according to an implementation of the disclosure.

In the following description, like components have the same reference numerals, regardless of different illustrated implementations. To illustrate implementations clearly and concisely, the drawings may not necessarily reflect appropriate scale and may have certain structures shown in somewhat schematic form. The disclosure may describe and/or illustrate structures in one implementation, and in the same way or in a similar way in one or more other implementations, and/or combined with or instead of the structures of the other implementations.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the disclosure in any manner.

The application, in various implementations, addresses deficiencies of existing frozen drink makers associated with controlling slush flow. Unfortunately, existing frozen drink makers must be very tall to provide sufficient headspace above the slush, so the slush does not contact the upper sidewalls of the vessel and the top of the chamber.

Accordingly, there is a need for features within the mixing chamber to effectively control the slush and keep it from migrating up the sidewalls and sticking to the top of the chamber. The need for controlling slush is especially important for household frozen drink makers (as compared to commercial models) because household frozen drink makers cannot rely on a tall chamber height to control slush flow.

The disclosed mixing vessels include at least one internal baffle (e.g., rib) positioned toward a front of the mixing chamber to optimize slush processing and flow within the vessel. The mixing vessel may include, one, two, three, or more internal baffles to control slush flow. For example, the mixing vessel may include a first baffle (i.e., a "side baffle") extending laterally along a sidewall of the vessel chamber, a second baffle (i.e., a "front baffle" positioned along a front surface of the vessel chamber, and/or a third baffle (i.e., a "corner baffle") positioned at a front top side of the vessel chamber, optionally extending between the side baffle and the corner baffle, if present. In implementations in which the corner baffle, side baffle, and front baffle are each present, the corner baffle may physically join the side baffle and the front baffle. The one or more internal baffles are arranged to keep slush off of the upper sidewalls and top of the mixing vessel chamber. Without wishing to be bound by theory, implementations in which the mixing vessel includes a side baffle, a front baffle, and a corner baffle connecting the side baffle and the front baffle, all three baffles may work in tandem to direct contents within the mixing vessel away from the top of the vessel. In contrast to commercial frozen drink makers with a significant amount of headspace in the mixing chamber, the disclosed mixing vessels may have a much shorter chamber, meaning a shorter distance between the center axis of the dasher and the top of the mixing vessel, to ensure the device can fit under a cabinet. The reduced chamber height of household frozen drink makers amplifies the need for precise slush control to keep slush from sticking to the upper sidewalls and top of the vessel, which can result in poor circulation, non-uniform dispensing, and product waste. Furthermore, the one or more baffles present in the vessel chamber may also deflect slush away from the chamber lid so that the lid does not get forced off, as in some commercial units.

FIG. 1 shows a perspective view of a frozen drink maker 100 according to an illustrative implementation of the disclosure. The frozen drink maker 100 includes a housing 102 and mixing vessel 104. The housing 102 may include user interface 112 for receiving user inputs to control frozen drink maker 100 and/or to output or display information. User interface 112 may include one or more buttons, dials, switches, touchscreens, indicators, LEDs, and the like. User interface 112 may display status information including for example, a temperature of a drink product within mixing vessel 104, an indicator of a recipe and/or program currently being implemented, a timer associated with the progress of a recipe and/or program in progress and/or currently being implemented. User interface 112 may provide indicators and/or warnings to users regarding, for example, when a recipe is complete or when a user is expected to perform an action associated with processing a drink product. User interface 112 may include a selectable menu of drink types (e.g., recipes) and/or programs for different types of drink products such as, without limitation, granita, smoothie, margarita, daiquiri, pina colada, slushi, cocktail, frappe, juice, diary, milk shake, cool drink, semi-frozen drink, frozen drink, and the like.

Housing 102 may include a panel (e.g., a removable panel) 114 along a side of the housing 102. Panel 114 may include a plurality of openings that facilitate air flow to aid in cooling components within housing 102. Housing 102 may include upper housing section 122 that is arranged to couple with a rear end of mixing vessel 104 when mixing vessel 104 is attached to housing 102. Mixing vessel 104 may include walls, or a portion thereof, that are transparent to enable a viewer to see a drink product within mixing vessel 104 during processing. Mixing vessel 104 may include pour-in opening 106 whereby mixing vessel 104 can receive ingredients for processing a drink product within mixing vessel 104. FIG. 1 shows pour-in opening 106 in a closed configuration with a cover sealing opening 106. The cover may be detachably removable or moveable to open or close opening 106. Pour-in opening 106 may include a grate to inhibit a user from reaching into mixing vessel 104 when pour-in opening 106 is open, i.e., the cover is not installed. Mixing vessel 104 may include dispenser assembly 108 having a user handle 120, a spout (not shown), and a spout shroud and/or cover 116. Dispenser assembly 108 enables a user, by pulling down on handle 120, to open a spout, connected to a wall of mixing vessel 104, to dispense a processed (e.g., cooled) drink product from mixing vessel 104. The user can close the spout by pushing handle 120 back to its upright position (shown in FIG. 1) and, thereby, stop the dispensing of the processed drink product. In some implementations, operation of user handle 120 of dispenser assembly 108 may allow a drink product to be released from mixing vessel 104 through an outlet (e.g., outlet 602 shown and described with regard to FIGS. 6B and 6C) of mixing vessel 104.

Frozen drink maker 100 may include a lever 110 that enables a locked coupling of mixing vessel 104 to housing 102 including upper housing section 122. FIG. 1 shows lever 110 in the locked and/or closed position whereby mixing vessel 104 is engaged and/or coupled to housing 102 and upper housing section 122. In the closed and/or engaged position, lever 110 ensures that there is a water-tight seal to prevent leakage of drink product from mixing vessel 104. Lever 110 may be placed in the closed, coupled, and/or engaged position by sliding mixing vessel 104 against upper housing section 122 and then rotating lever 110 in a clockwise direction until its handle rests on or about the top surface of upper housing section 122. Mixing vessel 104 can be disengaged and/or decoupled from housing 102 and upper housing section 122 by pulling and/or rotating lever 110 in a counter-clockwise direction (from the perspective of FIG. 1) toward the front of mixing vessel 104, which causes lever 110 to release mixing vessel 104. Once released and/or decoupled, mixing vessel 104 may slide in a forward direction (away from upper housing section 122) to be fully detached and/or removed from housing 102. Mixing vessel 104 may include a radial seal and/or face seal. The face seal may provide an improved seal based on compression provided by lever 110 pushing mixing vessel 104 laterally against a wall of upper housing section 122. Mixing vessel 104 may include a circular and/or cylindrical opening at its rear end that couples mixing vessel 104 to upper housing section 122. An interlock switch may be implemented at the upper housing section 122 that is activated when mixing vessel 104 is coupled to upper housing section 122 that prevents activation of drive motor 208 unless vessel 104 is coupled to upper housing section 122. This ensures that a user is not exposed to a moving dasher 204. Frozen drink maker 100 may also include drip tray 118 being positioned below dispenser assembly 108 and arranged to collect any drink product that is not properly dispensed from mixing vessel 104 to, for example, a user cup. Drip tray 118 may be attachably removable from its operational position shown in FIG. 1. For example, water tray 118 may mounted and/or stored on a side panel of housing 102 as illustrated in FIG. 3 as water tray 304.

Figure 2:
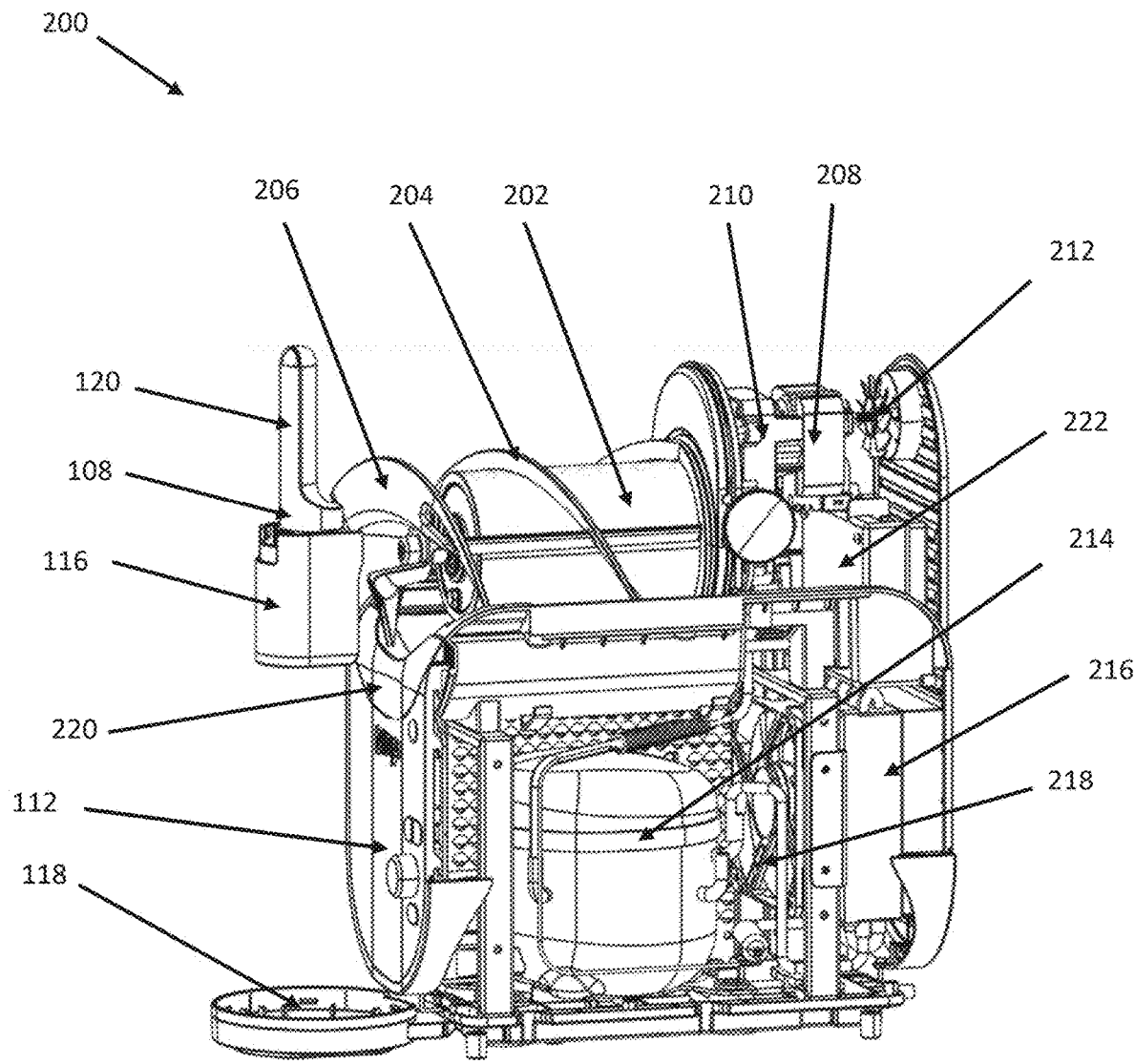
FIG. 2 shows a view of various internal components within the housing and mixing vessel of the frozen drink maker of FIG. 1 according to an implementation of the disclosure.

FIG. 2 shows a view 200 of various internal components within housing 102 and mixing vessel 104 of frozen drink maker 100 of FIG. 1. Frozen drink maker 100 includes a cylindrical evaporator 202 that is surrounded by dasher 204. Dasher 204 may include one or more mixing blades and/or protrusions that extend helically around evaporator and/or chiller 202. In some implementations, dasher 204 may include an auger. Dasher 204 may be driven to rotate by a central drive shaft (see FIG. 5C) within mixing vessel 104. The drive shaft may be surrounded by evaporator 202. However, in various implementations, evaporator 202 does not rotate. The drive shaft may be coupled via a gear assembly 210 to a drive motor 208. In some implementations, drive motor 208 is an AC motor, but another type of motor may be used such as, without limitation, a DC motor. Drive motor 208 may include a motor fan 212 arranged to provide air cooling for motor 208. While FIG. 2 shows an implementation where drive motor 208 is not coaxially aligned with the drive shaft used to rotate dasher 204, in other implementations, motor 208 can be aligned coaxially with the drive shaft. During processing of a drink product, motor 208 may be continuously operated at a one or more speeds to drive continuous rotation of dasher 204 and, thereby, provide continuous mixing of the drink product within mixing vessel 104. In some implementations, the rotation of dasher 204 causes the helically arranged blades to push the cooling drink product to the front of mixing vessel 104. During the processing, portions of the drink product may freeze against the surface of the evaporator as a result of being cooled by the evaporator. In some implementations, the blades of the rotating dasher 204 scrape frozen portions of the drink product from the surface the evaporator while concurrently mixing and pushing the cooling drink product towards the front of mixing vessel 104.

Frozen drink maker 100 may include a refrigeration circuit and/or system to provide cooling of a drink product and/or to control the temperature of a drink product within mixing vessel 104. The refrigeration circuit may include a compressor 214, an evaporator 202, a condenser 216, a condenser fan 218, a bypass valve, and conduit that carries refrigerant in a closed loop among the refrigeration circuit components. Operations of the refrigeration circuit may be controlled by a controller, such as processor 402, as described further with respect to FIG. 4 later herein. Frozen drink maker 100 may also include a condensation collection tray 220 arranged to collect any liquid condensation caused by cooling from evaporator 202. FIG. 2 shows tray 220 in the inserted position. Tray 220 may be insertably removable from a slot within housing 102 to enable collection of condensed liquid when inserted into the slot and then efficient removal to empty tray 220, and then re-insertion into the slot for subsequent liquid collection.

Figure 3:
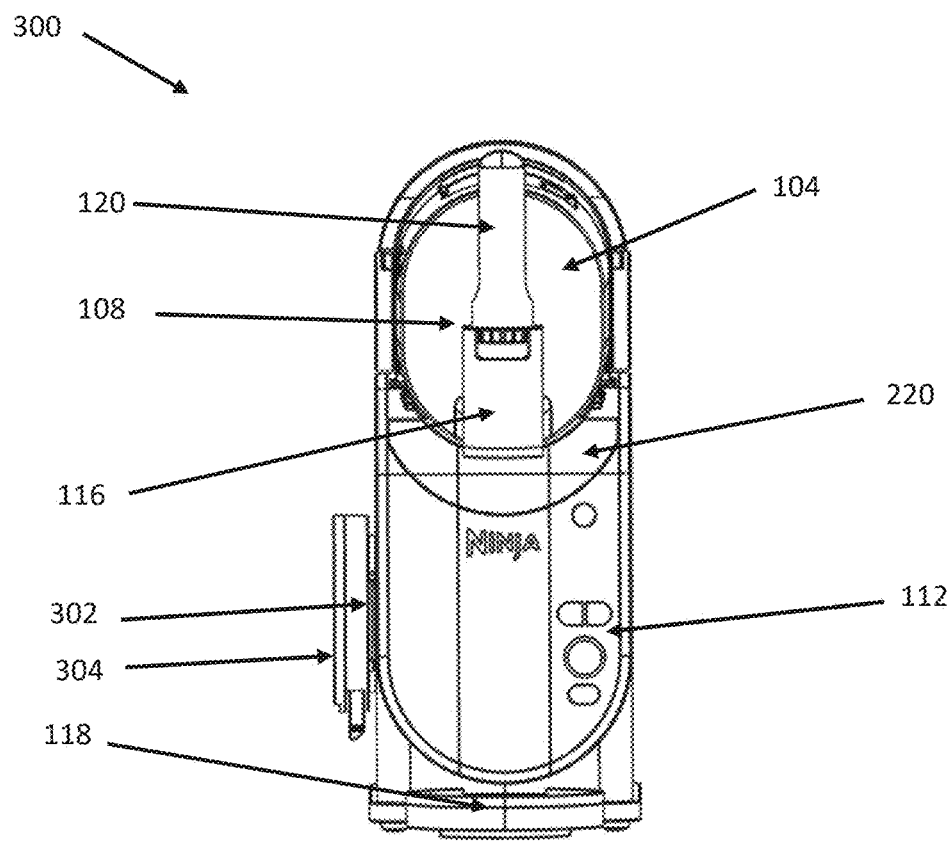
FIG. 3 shows a front view of the frozen drink maker of FIG. 1 according to some implementations of the disclosure.

FIG. 3 shows a front view 300 of frozen drink maker 100 of FIG. 1. Frozen drink maker 100 may include user interface 112 on a front surface of housing 102. In other implementations, user interface 112 may be located on a side, top, or back of housing 102. Frozen drink maker may include a mount 302 on a side of housing 102 where drip tray 118 can be mounted when not in use (shown as drip tray 304 in FIG. 3) such as during transport of frozen drink maker 100. Frozen drink maker 100 may include a power interface arranged to receive AC power from a power outlet (not shown). In some implementations, frozen drink maker 100 may include one or more batteries housed within housing 102 and arranged to provide power to various components of frozen drink maker 100. Frozen drink maker 100 may also include a printed circuit board assembly (PCBA) 222 within housing 102. As will be explained with respect to FIG. 4, PCBA 222 may include a control system 400 arranged to automatically control certain operations of frozen drink maker 100.

Figure 4:
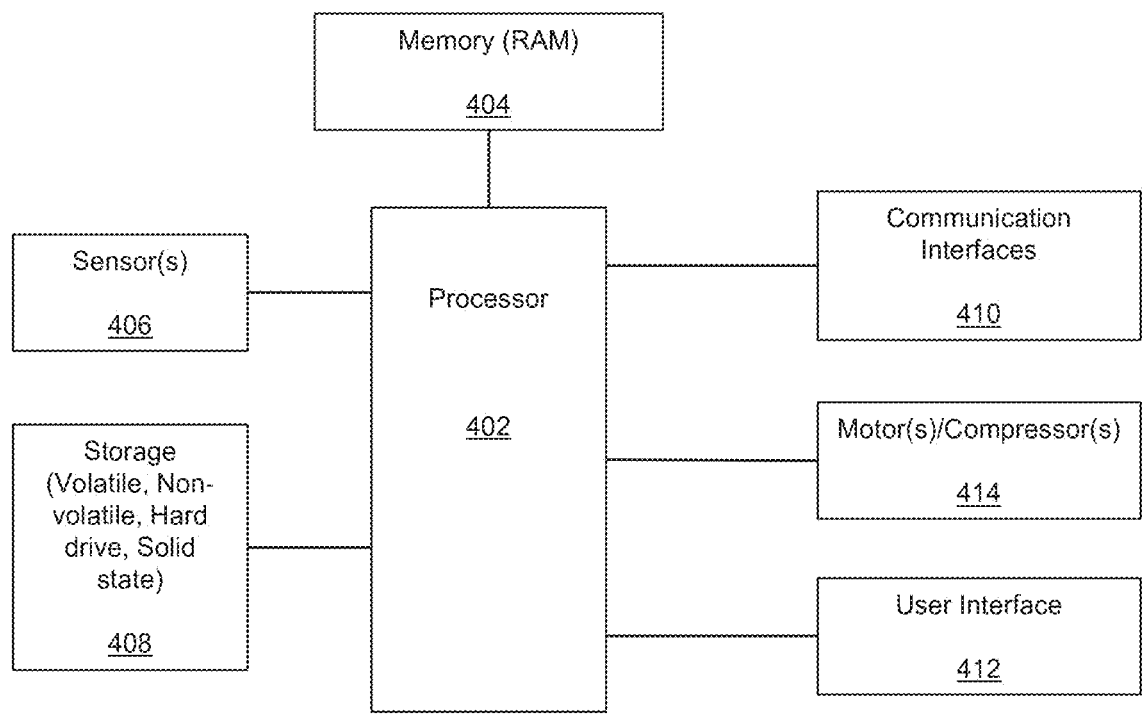
FIG. 4 is a block diagram of an example of a control system of the frozen drink maker of FIG. 1, according to some implementations of the disclosure.

FIG. 4 is a block diagram illustrating an example of a control system 400 of frozen drink maker 100 according to some implementations of the disclosure. Control system 400 may include a microcontroller, a processor, a system-on-a-chip (SoC), a client device, a physical computing device. In some implementations, control system 400 may include a hardware processor and/or virtual processor(s). In some implementations, control system 400 and elements as shown in FIG. 4 each relate to physical hardware, while in some implementations one, more, or all of the elements could be implemented using emulators or virtual machines. In some implementations, control system 400 may be implemented on physical hardware, such as in frozen drink maker 100.

As also shown in FIG. 4, control system 400 may include a user interface 212 and/or 112, having, for example, a keyboard, keypad, one or more buttons, dials, touchpad, or sensor readout (e.g., biometric scanner) and one or more output devices, such as displays, speakers for audio, LED indicators, and/or light indicators. Control system 400 may also include communications interfaces 410, such as a network communication unit that could include a wired communication component and/or a wireless communications component, which may be communicatively coupled to processor 402. The network communication unit may utilize any of a variety of proprietary or standardized network protocols, such as Ethernet, TCP/IP, to name a few of many protocols, to effect communications between processor 402 and another device, network, or system. Network communication units may also comprise one or more transceivers that utilize the Ethernet, power line communication (PLC), Wi-Fi, cellular, and/or other communication methods. For example, control system 400 may send one or more communications associated with a status of frozen drink maker 100 to a mobile device of a user, e.g., send an alert to the mobile device when a recipe is complete and/or a drink product is ready for dispensing, or to indicate that the mixing vessel is low or out of a drink product.

Control system 400 may include a processing element, such as processor 402, that contains one or more hardware processors, where each hardware processor may have a single or multiple processor cores. In one implementation, the processor 402 includes at least one shared cache that stores data (e.g., computing instructions) that are utilized by one or more other components of processor 402. For example, the shared cache may be a locally cached data stored in a memory for faster access by components of the processing elements that make up processor 402. Examples of processors include but are not limited to a central processing unit (CPU) and/or microprocessor. Processor 402 may utilize a computer architecture base on, without limitation, the Intel® 8051 architecture, Motorola® 68HCX, Intel® 80X86, and the like. The processor 402 may include, without limitation, an 8-bit, 12-bit, 16-bit, 32-bit, or 64-bit architecture. Although not illustrated in FIG. 4, the processing elements that make up processor 402 may also include one or more other types of hardware processing components, such as graphics processing units (GPUs), application specific integrated circuits (ASICs), field-programmable gate arrays (FPGAs), and/or digital signal processors (DSPs).

FIG. 4 also illustrates that memory 404 may be operatively and communicatively coupled to processor 402. Memory 404 may be a non-transitory medium configured to store various types of data. For example, memory 404 may include one or more storage devices 408 that include a non-volatile storage device and/or volatile memory. Volatile memory, such as random-access memory (RAM), can be any suitable non-permanent storage device. The non-volatile storage devices 408 may include one or more disk drives, optical drives, solid-state drives (SSDs), tape drives, flash memory, read-only memory (ROM), and/or any other type of memory designed to maintain data for a duration time after a power loss or shut down operation. In certain configurations, the non-volatile storage devices 408 may be used to store overflow data if allocated RAM is not large enough to hold all working data. The non-volatile storage devices 408 may also be used to store programs that are loaded into the RAM when such programs are selected for execution. Data store and/or storage devices 408 may be arranged to store a plurality of drink product making and/or processing instruction programs associated with a plurality of drink product processing sequences, i.e., recipes. Such drink product making and/or processing instruction programs may include instruction for. 0processor 402 to: start or stop one or motors and/or compressors 414 (e.g., such as motor 208 and/or compressor 214), start or stop compressor 214 to regulate a temperature of a drink product being processed within mixing vessel 104, operate the one or more motors 414 (e.g., motor 208 and/or compressor 214) at certain periods during a particular drink product processing sequence, operate motor 208 at certain speeds during certain periods of time of a recipe, issue one or more cue instructions to user interface 412 and/or 112 that are output to a user to illicit a response, action, and/or input from the user.

Persons of ordinary skill in the art are aware that software programs may be developed, encoded, and compiled in a variety of computing languages for a variety of software platforms and/or operating systems and subsequently loaded and executed by processor 402. In one implementation, the compiling process of the software program may transform program code written in a programming language to another computer language such that the processor 402 is able to execute the programming code. For example, the compiling process of the software program may generate an executable program that provides encoded instructions (e.g., machine code instructions) for processor 402 to accomplish specific, non-generic, particular computing functions.

After the compiling process, the encoded instructions may be loaded as computer executable instructions or process steps to processor 402 from storage 408, from memory 404, and/or embedded within processor 402 (e.g., via a cache or on-board ROM). Processor 402 may be configured to execute the stored instructions or process steps in order to perform instructions or process steps to transform the electronic control system 400 into a non-generic, particular, specially programmed machine or apparatus. Stored data, e.g., data stored by a data store and/or storage device 408, may be accessed by processor 402 during the execution of computer executable instructions or process steps to instruct one or more components within control system 400 and/or other components or devices external to system 400. For example, the recipes may be arranged in a lookup table and/or database within data store 408 and be accessed by processor 402 when executing a particular recipe selected by a user via user interface 412 and/or 112.

User interface 412 and/or 112 can include a display, positional input device (such as a mouse, touchpad, touchscreen, or the like), keyboard, keypad, one or more buttons, one or more dials, a microphone, speaker, or other forms of user input and output devices. The user interface components may be communicatively coupled to processor 402. When the user interface output device is or includes a display, the display can be implemented in various ways, including by a liquid crystal display (LCD) or a cathode-ray tube (CRT) or light emitting diode (LED) display, such as an OLED display.

Sensors 406 may include one or more sensors that detect and/or monitor conditions of a drink product within mixing vessel 104, conditions associated with a component of the frozen drink maker 100, and/or conditions of a refrigerant within the refrigeration system. Conditions may include, without limitation, rotation, speed of rotation, and/or movement of a device or component (e.g., a motor), rate of such movement, frequency of such movement, direction of such movements, motor current, motor voltage, motor power, motor torque, temperature, pressure, fluid level in vessel 104, position of a device or component (e.g., whether pour-in opening 106 is open or closed), and/or the presence of a device or component (e.g., whether shroud 116 is installed or not). Types of sensors may include, for example, electrical metering chips, Hall sensors, pressure sensors, temperature sensors, optical sensors, current sensors, torque sensors, voltage sensors, cameras, other types of sensors, or any suitable combination of the foregoing. Frozen drink maker 100 may include one or more temperature sensors positioned in various locations within mixing vessel 104 such as, for example, on or about the lower front area within mixing vessel 104, on or about the upper front area within mixing vessel 104, on or about the upper rear area within vessel 104, within one or more coils of evaporator 202, and/or within housing 102.

Sensors 406 may also include one or more safety and/or interlock switches that prevent or enable operation of certain components, e.g., a motor, when certain conditions are met (e.g., enabling activation of motor 208 and/or 414 when a lid or cover for opening 106 is attached or closed and/or when a sufficient level of drink product is in vessel 104). Persons of ordinary skill in the art are aware that electronic control system 400 may include other components well known in the art, such as power sources and/or analog-to-digital converters, not explicitly shown in FIG. 4.

In some implementations, control system 400 and/or processor 402 includes an SoC having multiple hardware components, including but not limited to: a microcontroller, microprocessor or digital signal processor (DSP) core and/or multiprocessor SoCs (MPSoC) having more than one processor cores; memory blocks including a selection of read-only memory (ROM), random access memory (RAM), electronically erasable programmable read-only memory (EEPROM) and flash memory; timing sources including oscillators and phase-docked loops; peripherals including counter-timers, real-time timers and power-on reset generators; external interfaces, including industry standards such as universal serial bus (USB), FireWire, Ethernet, universal synchronous/asynchronous receiver/transmitter (USART), serial peripheral interface (SPI); analog interfaces including analog-to-digital converters (ADCs) and digital-to-analog converters (DACs); and voltage regulators and power management circuits.

A SOC includes both the hardware, described above, and software controlling the microcontroller, microprocessor and/or DSP cores, peripherals and interfaces. Most SoCs are developed from pre-qualified hardware blocks for the hardware elements (e.g., referred to as modules or components which represent an IP core or IP block), together with software drivers that control their operation. The above listing of hardware elements is not exhaustive. A SoC may include protocol stacks that drive industry-standard interfaces like a universal serial bus (USB).

Once the overall architecture of the SoC has been defined, individual hardware elements may be described in an abstract language called RTL which stands for register-transfer level. RTL is used to define the circuit behavior. Hardware elements are connected together in the same RTL language to create the full SoC design. In digital circuit design, RTL is a design abstraction which models a synchronous digital circuit in terms of the flow of digital signals (data) between hardware registers, and the logical operations performed on those signals. RTL abstraction is used in hardware description languages (HDLs) like Verilog and VHDL to create high-level representations of a circuit, from which lower-level representations and ultimately actual wiring can be derived. Design at the RTL level is typical practice in modern digital design. Verilog is standardized as Institute of Electrical and Electronic Engineers (IEEE) 1364 and is an HDL used to model electronic systems. Verilog is most commonly used in the design and verification of digital circuits at the RTL level of abstraction. Verilog may also be used in the verification of analog circuits and mixed-signal circuits, as well as in the design of genetic circuits. In some implementations, various components of control system 400 are implemented on a PCB such as PCB 222.

In operation in certain implementations, a user fills mixing vessel 104 via pour-in opening 106 with ingredients associated with a drink product. The user selects the type of drink product to be processed via user interface 112, e.g., the user selects the recipe for "margarita." In some implementations, the user selects the product type and/or recipe before filling mixing vessel 104 and the user interface 112 provides one or more indicators or queues (visible and/or audible) that instruct the user to add ingredients to mixing vessel 104. Mixing vessel 104 may include one or more fill sensors that detect when a sufficient amount or level of ingredients and/or fluid is within mixing vessel 104. The one or more fill sensors may provide a signal to processor 402 that indicates when vessel 104 is sufficiently filled or not filled. Processor 402 may prevent operations of the frozen drink maker 100 (e.g., prevent activation of motor 208 and/or other components) if the fill sensor(s) 406 indicate that vessel 104 is not sufficiently filled. A lid sensor may be associated with opening 106 whereby the lid sensor sends an open and/or closed signal to processor 402 that indicates whether opening 106 is open or closed. Processor 402 may prevent operations of the frozen drink maker 100 if the lid sensor indicates that opening 106 is open and/or not closed. Depending on the sensed condition, user interface 112 may provide an indication regarding the condition, e.g., that vessel 104 is sufficiently filled or not sufficiently filled and/or that opening 106 is not closed, to enable a user to take appropriate action(s).

Once mixing vessel 104 is filled with ingredients, the user may provide an input, e.g., a button press, to start processing of the drink product based on the selected recipe. Processing may include activation of motor 208 to drive rotation of dasher 204 and/or blade 206 to effect mixing of the ingredients of the drink product. Processing may also include activation of the refrigeration system including activation of compressor 214 and condenser fan 218. The compressor 214 facilitates refrigerant flow through one or more coils of evaporator 202 and through condenser 216 to provide cooling and/or temperature control of the drink product within mixing vessel 104. Processor 402 may control operations of various components such as motor 208 and compressor 214. To regulate temperature at a particular setting associated with a recipe, processor 402 may activate/start and/or de-activate/stop compressor 214 to start and/or stop refrigerant flow through the coil(s) of evaporator 202 and, thereby, start or stop cooling of the drink product within mixing vessel 104.

By cooling a drink product to a particular temperature, slush and/or ice particles may be formed within the drink product. Typically, the amount of particles and/or texture of a drink product corresponds to a temperature of the drink product, i.e., the cooler the temperature—the larger the amount of particles (and/or the larger the size of particles) and/or the more slushi the drink product. User interface 112 may enable a user to fine tune and/or adjust a preset temperature associated with a recipe to enable a user to adjust the temperature and/or texture of a drink product to a more desirable temperature and/or texture.

Processor 402 may perform processing of the drink product for a set period of time in one or more phases and/or until a desired temperature and/or texture is determined. Processor 402 may receive one or more temperature signals from one or more temperature sensors 408 within mixing vessel 104 to determine the temperature of the drink product. Processor 402 may determine the temperature of the drink product by determining an average temperature among temperatures detected by multiple temperature sensors 408. Processor 402 may determine the temperature of the drink product based on the detected temperature from one sensor 408 within mixing vessel 104 and/or based on a temperature of the refrigerant detected by a refrigerant temperature sensor 408. Once a phase and/or sequence of a recipe is determined to be completed by processor 402, processor 402 may, via user interface 116, provide a visual and/or audio indication that the recipe is complete and ready for dispensing. In response, a user may place a cup or container below dispenser assembly 108 and pull handle 120 rotationally downward towards the user to open a spout located at the lower front wall of mixing vessel 104, resulting in dispensing of the drink product into the cup or container. Once filled, the user can close the spout by pushing handle 120 back rotationally upward away from the user to its upright position shown in FIG. 2.

Figure 5A:
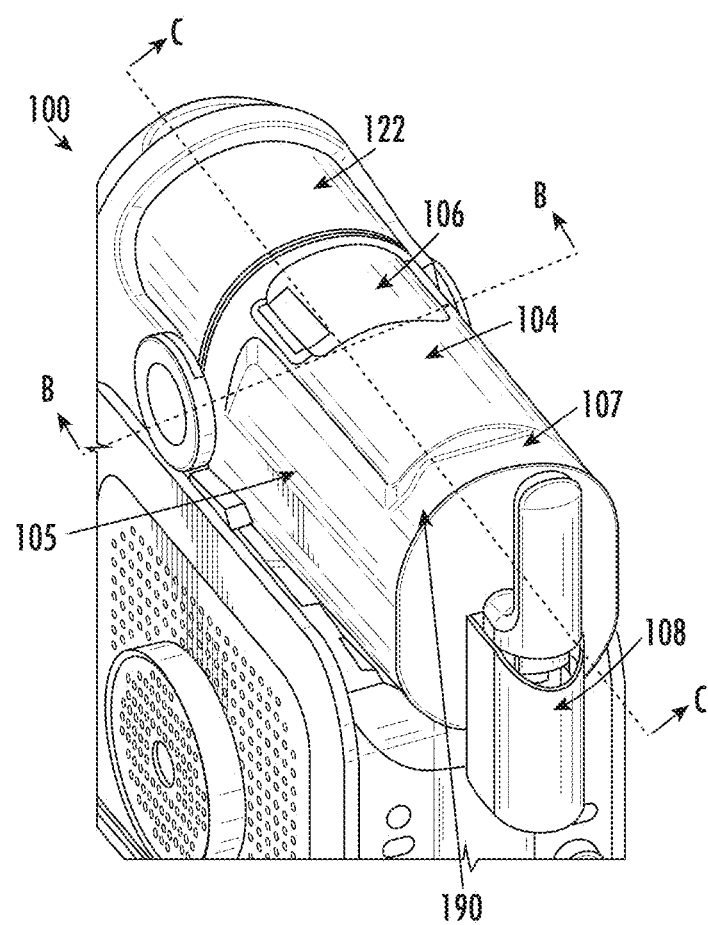
FIG. 5A shows an isometric view of the frozen drink maker with a mixing vessel having at least one internal baffle, in accordance with some implementations of the disclosure.
Figure 5B:
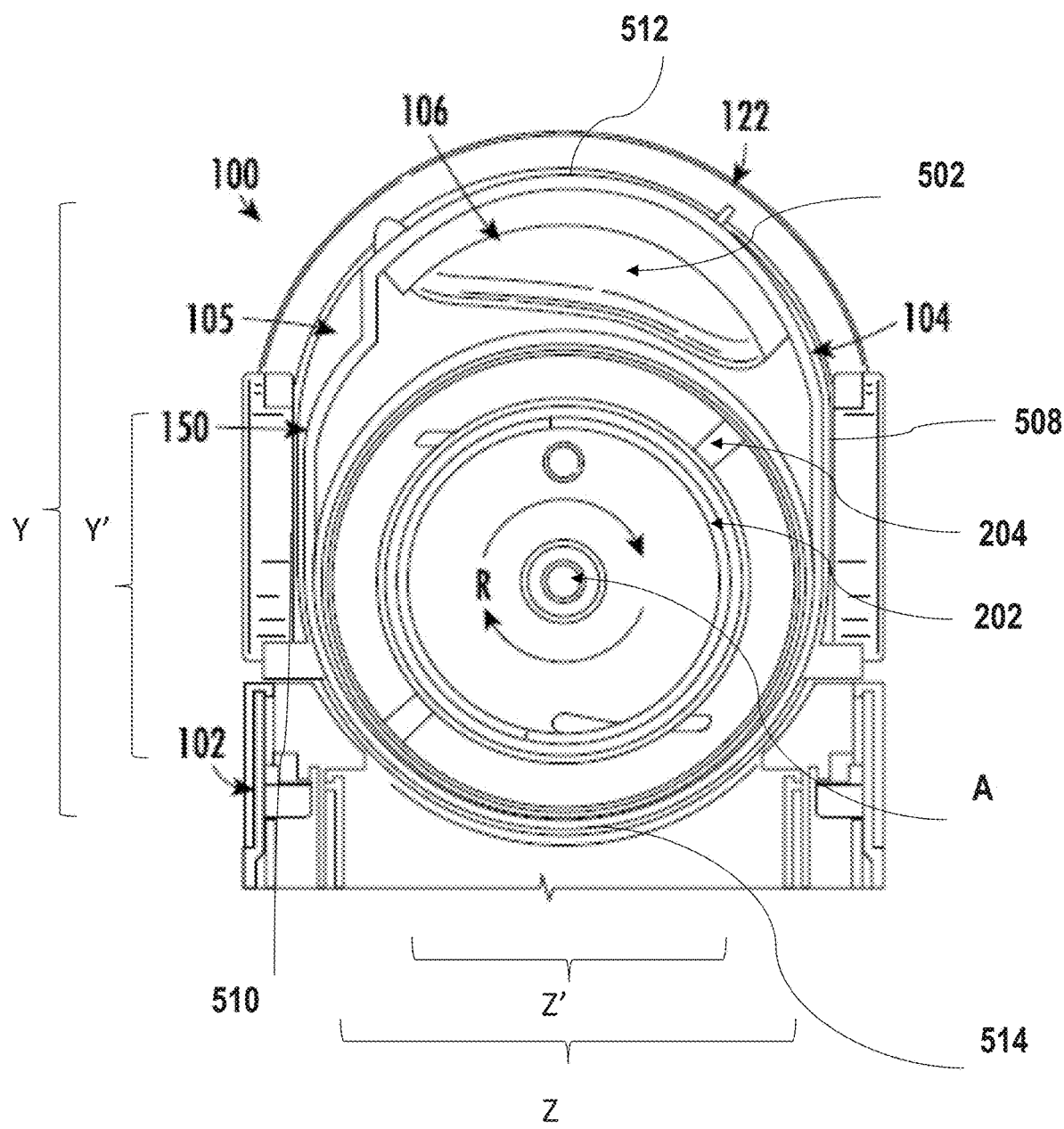
FIG. 5B shows a cross-sectional view of the frozen drink maker shown in FIG. 5A, taken along line B-B.
Figure 5C:
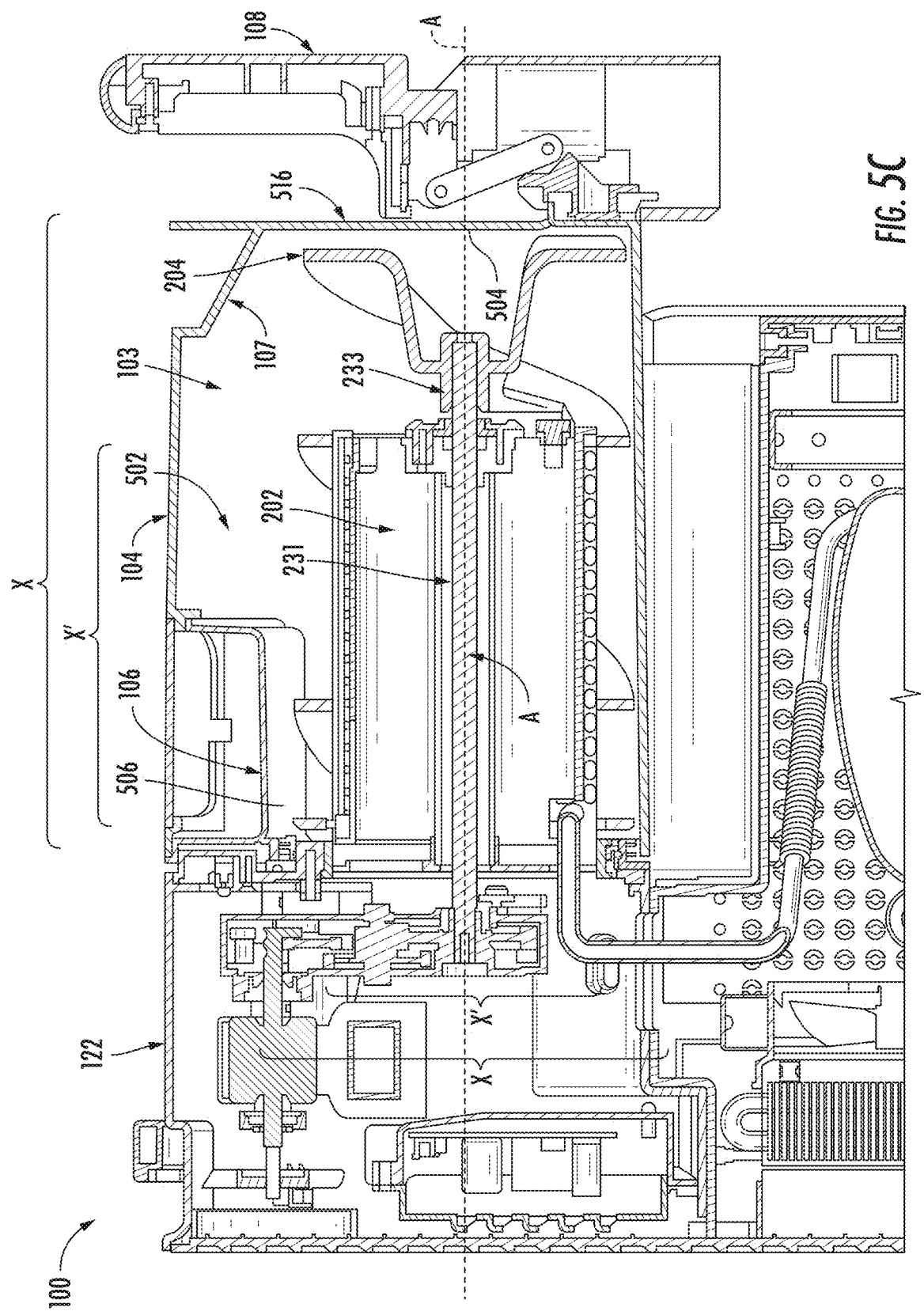
FIG. 5C shows a cross-sectional view of the frozen drink maker shown in FIG. 5A, taken along line C-C.

FIGS. 5A-5C show a sample frozen drink maker 100 with a mixing vessel 104 coupled to a housing 102 (specifically, the upper housing section 122) and dispenser assembly 108, according to some implementations. Mixing vessel 104 has a curved sidewall defining vessel chamber 502 within. In some implementations, vessel chamber 502 may be at least partly cylindrical. For example, in some implementations, vessel chamber 502 may be substantially cylindrical. As shown in FIGS. 5B and 5C, vessel chamber 502 may include a front 504, a rear 506, a right side 508, a left side 510, a top, and a bottom.

In some implementations, mixing vessel 104 is shaped as an ovoid or approximately as an ovoid (i.e., a cylinder with an ovular cross-section), or as an elliptic cylinder (i.e., a cylinder with an elliptic cross-section), or an approximate elliptic cylinder. When coupled to the housing 102, the front of mixing vessel 104 contacts dispenser assembly 108 and the rear of mixing vessel 104 abuts the upper housing section 122. Within mixing vessel 104, the front face of the chamber may have a substantially ovular shape or a substantially circular shape. The rear of mixing vessel 104 chamber may include an opening configured to form a seal with the upper housing section 122. The opening at the rear of mixing vessel 104 may have a substantially circular shape or a substantially ovular shape. Mixing vessel 104 is sized to accommodate dasher 204 that connects to drive shaft 231 via hub 233 and rotates about a center axis (shown as center axis "A" in FIG. 5C). FIG. 5B shows a possible direction of dasher 204 rotation ("R"). Mixing vessel 104 may be shaped such that a distance from the center axis (A) of dasher 204 to the top of vessel chamber 502 is less than 6 inches, less than 8 inches, less than 10 inches, less than 12 inches, less than 14 inches, or less than 16 inches.

In some implementations, mixing vessel 104 may include at least one asymmetric wall. In some implementations, the at least one asymmetric wall may be proximate to at least one of the front or the top of vessel chamber 502. In this way, the at least one asymmetric wall may be configured to promote slush flow within vessel chamber 502 of mixing vessel 104. In some implementations, the at least one asymmetric wall may be positioned such that dasher 204 directs a drink product toward the at least one asymmetric wall while moving the drink product upwardly within vessel chamber 502 of mixing vessel 104.

Figure 6A:
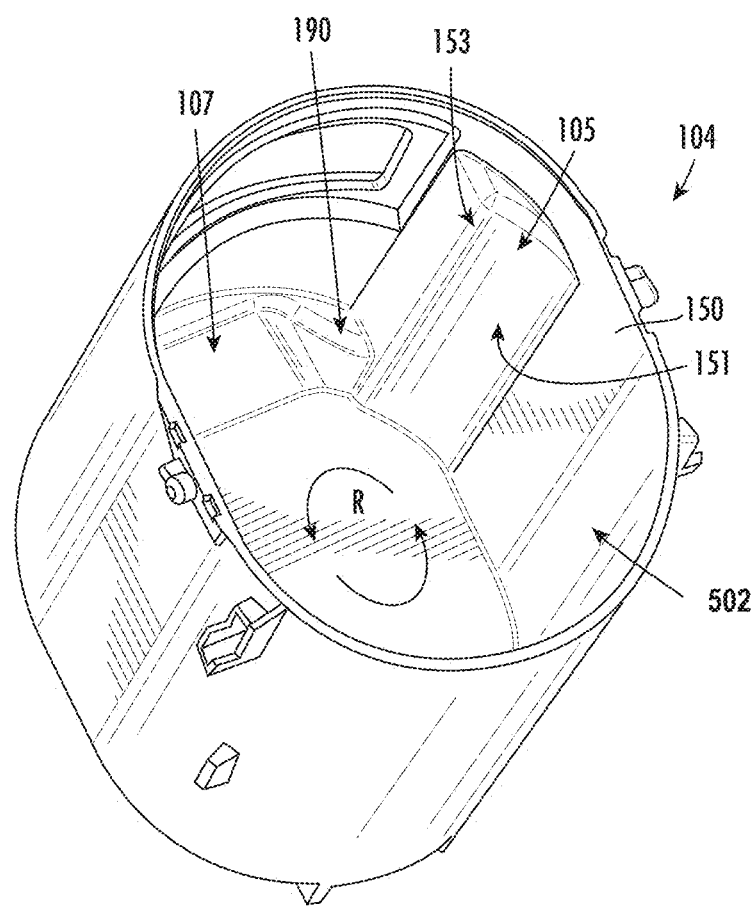
FIG. 6A shows a rear isometric view of a mixing vessel for a frozen drink maker with three internal baffles, in accordance with some implementations of the disclosure.
Figure 6B:
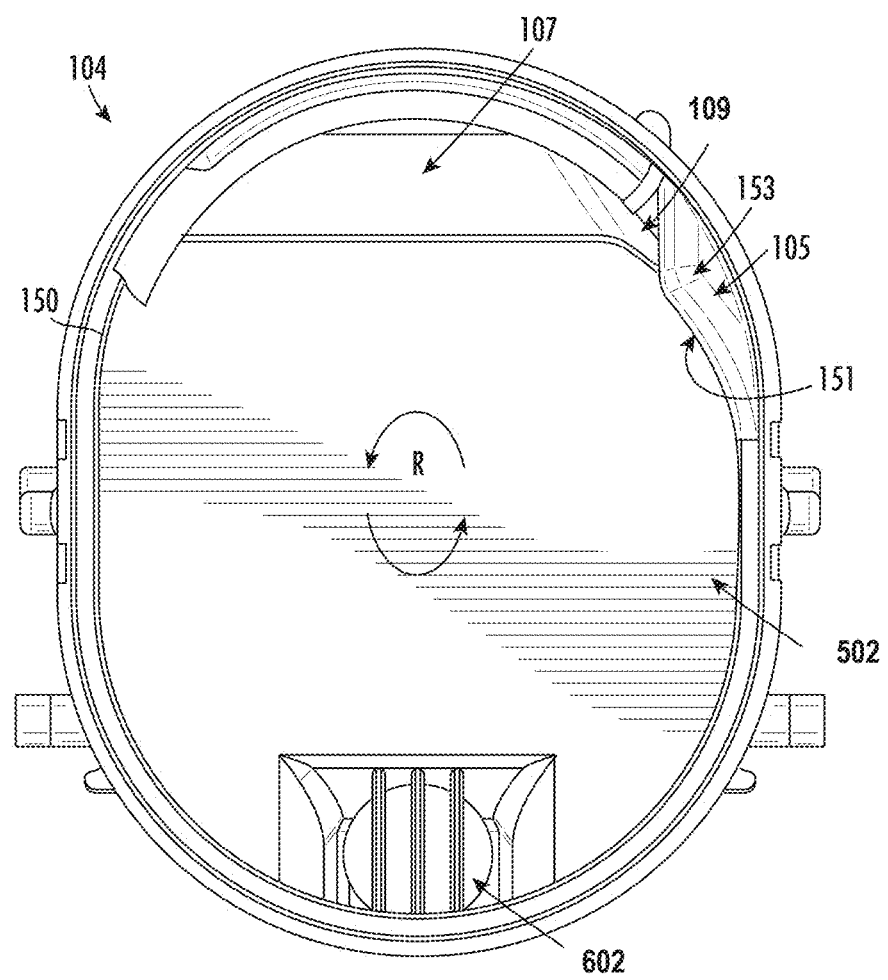
FIG. 6B shows a rear view of the mixing vessel shown in FIG. 6A.
Figure 6C:
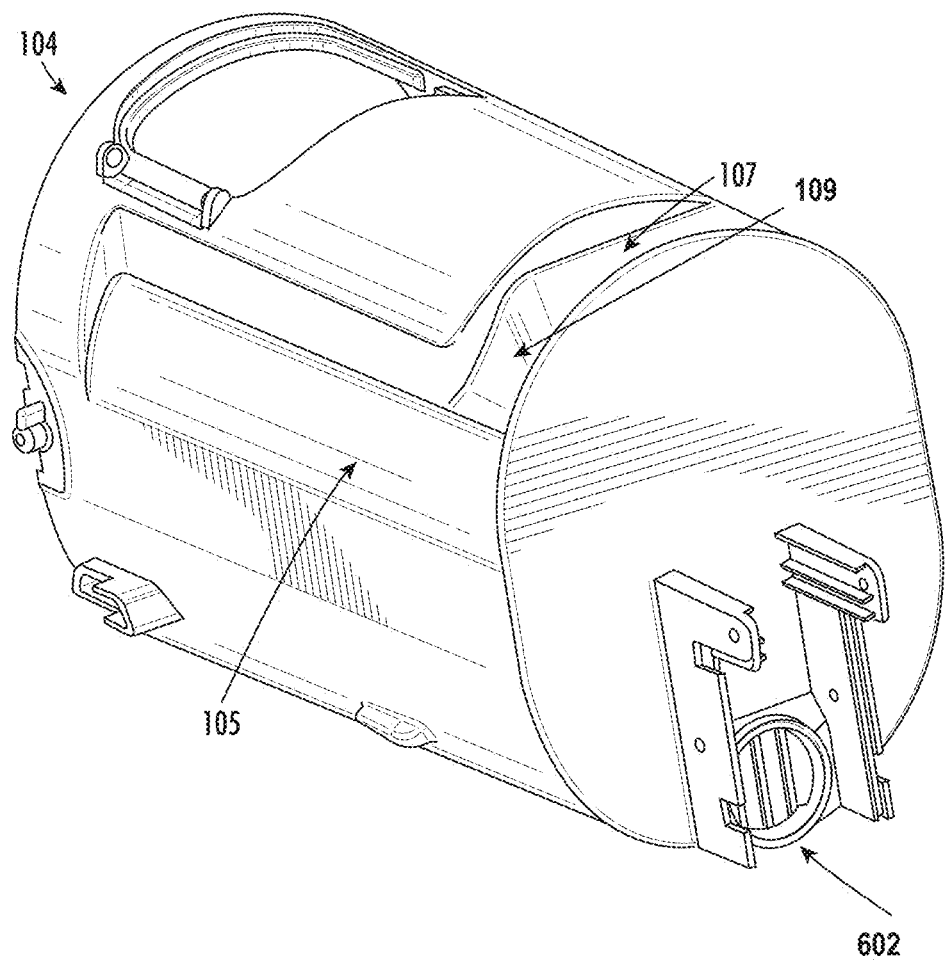
FIG. 6C shows a front isometric view of the mixing vessel shown in FIG. 6A.

FIGS. 6A-6C show an example of mixing vessel 104 with the at least one asymmetric wall including at least one internal baffle configured to control slush flow within mixing vessel 104. As shown in FIGS. 5A, 5B, and 6A-6B, mixing vessel 104 may include side baffle 105 the at least one asymmetric wall. In some implementations, side baffle 105 may extend laterally along a sidewall 150 of vessel chamber 502. In some implementations, side baffle 105 extends from the front of vessel chamber 502 (or approximate thereto) to the rear of vessel chamber 502 (or approximate thereto). In some implementations, side baffle 105 extends along the chamber sidewall in a direction parallel to the center axis (A) of dasher 204. In some implementations, side baffle 105 is positioned on a left side (when viewed from the front) of the chamber sidewall (e.g., in embodiments in which the dasher rotates in a clockwise direction). FIGS. 6A and 6C illustrate a clockwise direction of dasher rotation (R) when viewed from the front. Side baffle 105 may be positioned slightly above the center axis (A) of dasher 204, in some implementations.

Side baffle 105 may include a curved surface 151 that conforms to the pathway of dasher 204, as shown in FIGS. 6A and 6B. For example, when viewed along the center axis (A) of the dasher, side baffle 105 may protrude inwardly relative the ovular (e.g., elliptical) cross-section of chamber sidewall 150, where, starting from a bottom end of side baffle 105 at which curved surface 151 of side baffle 105 is vertical or substantially vertical, curved surface 151 may slope gradually inward until reaching an inflection point 153. After reaching the inflection point 153, curved surface 151 may slope more sharply vertically until the top end of side baffle 105 is reached and, thereafter, curved surface 151 of side baffle 105 returns to a curvature in conformance with the ovular cross-section of chamber sidewall 150. The radial direction of curved surface 151 of side baffle 105 from its bottom to the inflection point 153 is generally aligned with the radial movement of dasher 204 and thus the contents of vessel chamber 502. The cross-sectional geometry of side baffle 105 described above directs the contents of the vessel away from a top of vessel chamber 502 (i.e., at a lower radial trajectory than if side baffle 105 was not present, such as the right side 508 of vessel chamber 502 as shown in FIG. 5B). If side baffle 105 was not present, contents of vessel chamber 502 could flow unimpeded up the sidewall 150 to a top interior surface of vessel chamber 502, which would leave these contents excluded from mixing and/or allow them to escape from mixing vessel 104. Side baffle 105 thus reduces the amount of frozen material that could otherwise form on the top interior surface of mixing vessel 104 as a result of its contents being rotated upwards.

In some implementations, side baffle 105 may extend laterally along left side 510 or right side 508 of vessel chamber 502. Side baffle may be configured to promote slush flow away from left side 510 or right side 508 of vessel chamber 502 and back toward center axis A.

As shown in FIGS. 5B, 5C, and 6A-C, mixing vessel 104 may include front baffle 107 as the at least one asymmetric wall. If present, front baffle 107 may be positioned at a front top portion of vessel chamber 502 (illustrated in FIG. 5B). In some implementations, front baffle 107 extends along the front face of vessel chamber 502 between the right sidewall and the left sidewall of vessel chamber 502. The rotation of dasher 204 pushes vessel contents towards the front of vessel chamber 502, where, if left unchecked, contents could build up near the top front, perhaps even creating a frozen mass detrimental to the mixing process. Viewing from the cross-section of FIG. 5C, front baffle 107 may form an angle relative the front face of vessel chamber 502 (e.g., 100°-150°, 100°-125°, or 105°-120°), which redirects vessel contents that have been forced into the top front of mixing vessel 104 towards the rear of vessel chamber 502. In some implementations, front baffle 107 may include a curved surface extending upwardly from the front face of vessel chamber 502 toward top 512 of vessel chamber 502. In some such implementations, the angle of front baffle 107 forms relative to front 504 of vessel chamber 502 varies from a lower angle (e.g., 5°-20°) at a section of front baffle 107 proximate to the front face of vessel chamber 502 to a higher angle (e.g., 75°-90°) at a section of front baffle proximate to the top of vessel chamber 502.

Front baffle 107 is configured to urge contents away from the top surface of vessel chamber 502 to avoid buildup and overflow on the top of mixing vessel 104. Front baffle 107 thus reduces the amount of frozen material that could otherwise form on the top front interior surface of mixing vessel 104 as a result of the action of dasher 204. In some implementations, front baffle 107 may be positioned at an intersection of front 504 and top 512 of vessel chamber 502. Front baffle 107 may be configured to promote slush flow away from the intersection of front 504 and top 512 of vessel chamber 502 and back toward center axis A.

As further shown in FIGS. 5B and 5C, vessel chamber 502 of mixing vessel 104 of drink maker 700 may have first dimension X, second dimension Y, and third dimension Z and dasher 204 may have first dimension X', second dimension Y', and third dimension Z'. In some implementations, first dimension X and X' may refer to a length of vessel chamber 502 of mixing vessel 104 and a length of dasher 204, respectively, second dimension Y and Y' may refer to a height of vessel chamber 502 of mixing vessel 104 and a height of dasher 204, respectively, and third dimension Z and Z' may refer to a width of vessel chamber 502 of mixing vessel 104 and a width of dasher 204. In some implementations, a height (e.g., a total height) Y of vessel chamber 502 may be less than or equal to 180% of a height (e.g., a total height) Y' of dasher 204. In some implementations, a width (e.g., a total width) Z of vessel chamber 502 is less than or equal to 140% of a width (e.g., a total width) Z' of dasher 204. In some implementations, a length (e.g., a total length) X of vessel chamber 502 may be less than or equal to 120% of a length (e.g., a total length) X' of the dasher.

As shown in FIGS. 5C and 6A-6C, mixing vessel 104 may include corner baffle 109 as the at least one asymmetric wall. Corner baffle 109 may be positioned at a front top side of vessel chamber 502. Corner baffle 109 joins or connects side baffle 105 and front baffle 107. Thus, if side baffle 105, front baffle 107, and corner baffle 109 are each present, corner baffle 109 physically joins side baffle 105 to front baffle 107. As shown in FIGS. 6A-6B, side baffle 105 and front baffle 107 are orthogonal to each other and if these baffles terminated in a hard corner without corner baffle 109, slush may not be properly directed. Connecting side baffle 105 and front baffle 107 with corner baffle 109 allows slush to easily flow out of the corner between side baffle 105 and front baffle 107.

Corner baffle 109 has a curved surface 155 that extends from side baffle 105 to front baffle 107. Curved surface 155 may be convex, as shown in FIG. 6A. Along its length, corner baffle 109 extends into vessel chamber 502 at a relatively constant distance. In other words, the depth of corner baffle 109 may be relatively constant along the length of corner baffle 109. The side of vessel chamber 502 in which corner baffle 109 is positioned (e.g., the left side or the right side) can be selected based on the direction in which dasher 204 rotates within mixing vessel 104. In particular, corner baffle 109 may be positioned such that dasher 204 is directed toward corner baffle 109 while moving upwardly within vessel chamber 502. For example, in select implementations, corner baffle 109 is positioned at the left top front of vessel chamber 502 when the dasher is arranged to rotate in a clockwise direction. This positioning may advantageously force slush downward toward dasher 204 when the slush contacts corner baffle 109 as the slush moves upwardly with dasher 204, thereby reducing slush buildup on the sidewall and the top of mixing vessel 104.

In some implementations, corner baffle 109 may be positioned proximal to an intersection of front 504 and top 512 of vessel chamber 502 and positioned proximal to right side 508 or left side 510 of vessel chamber 502. Corner baffle 109 may be configured to promote slush flow away from a corner of vessel chamber 502 and back toward center axis A.

It should be understood that, in some implementations, mixing vessel 104 includes one, two, three, or more internal baffles positioned within vessel chamber 502. In other words, mixing vessel 104 may include side baffle 105, front baffle 107, and/or corner baffle 109. Side baffle 105, front baffle 107, and/or corner baffle 109 can reduce slush buildup on the sidewalls and top of vessel chamber 502, which is important for commercial frozen drink makers as well as household frozen drink makers with significantly less headspace than commercial units.

As further shown in FIGS. 6B and 6C, mixing vessel 104 may include outlet 602. In some implements, outlet 602 may be proximal to an intersection of front 504 and bottom 514 of vessel chamber 502. Outlet 602 may be configured to release a drink product from vessel chamber 502. In some implementations, outlet may be on (e.g., positioned on) front surface 516 of mixing vessel 104 adjacent front 504 of vessel chamber 504. In some implementations, outlet 602 may be fluidly connected to a dispensing assembly 108, which may be at least partly positioned on front surface 516 of mixing vessel 104.

Figure 7:
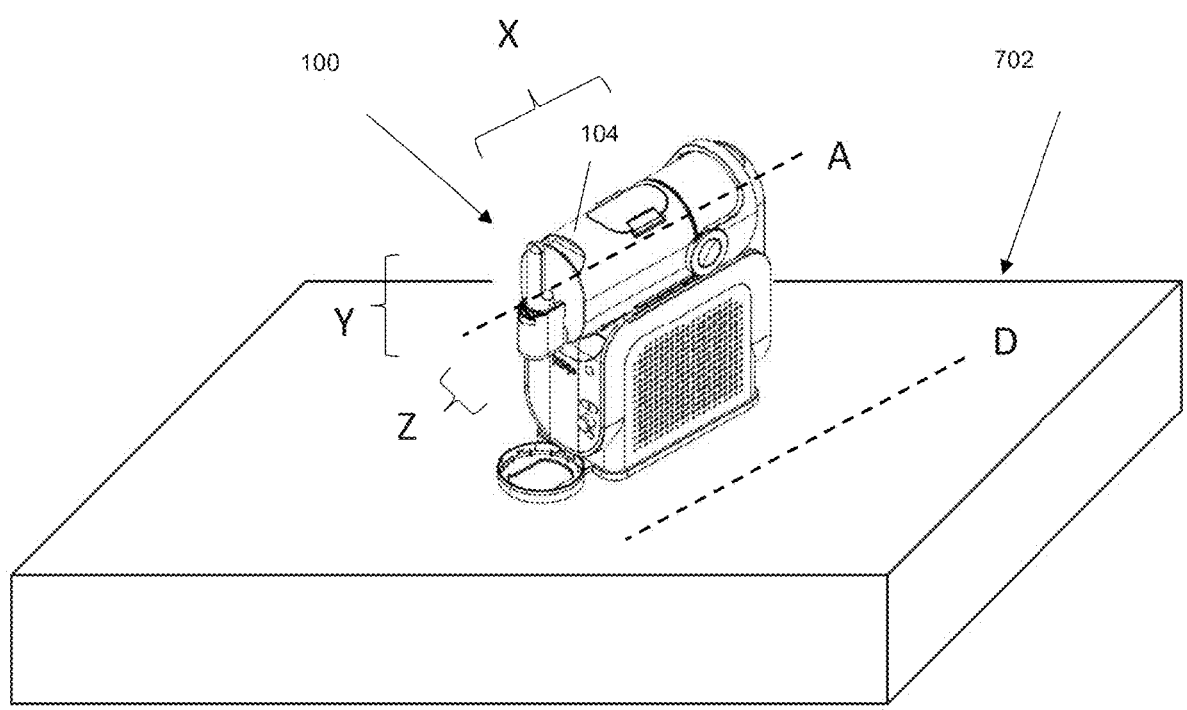
FIG. 7 shows a diagram of drink maker positioned on a mounting surface.

Referring now to FIG. 7, FIG. 7 is a diagram of drink maker 100 positioned on mounting surface 702, such as a countertop. As shown in FIG. 7, vessel chamber 502 of mixing vessel 104 of drink maker 700 may have first dimension X, second dimension Y, and third dimension Z. In some implementations, first dimension X may refer to a length of vessel chamber 502 of mixing vessel 104, second dimension Y may refer to a height of vessel chamber 502 of mixing vessel 104, and third dimension Z may refer to a width of vessel chamber 502 of mixing vessel 104. As further shown in FIG. 7, drink maker 700 may include center axis A (e.g., as described with regard to FIG. 5C) of a dasher (e.g., dasher 204) which is positioned within vessel chamber 502 and rotates about center axis A to move a drink product within vessel chamber 502. In some implementations, a largest dimension of vessel chamber 502 of mixing vessel 104 of drink maker 700 is oriented along horizontal axis D that is parallel to mounting surface 702 of drink maker 700. In some implementations, horizontal axis D may be parallel to center axis A about which the dasher rotates. For example, as shown in FIG. 7, first dimension X is the largest dimension of vessel chamber 502 of mixing vessel 104 of drink maker 700 and first dimension X is oriented along horizontal axis D, which is parallel to mounting surface 702 of drink maker 700.

Figure 8A:
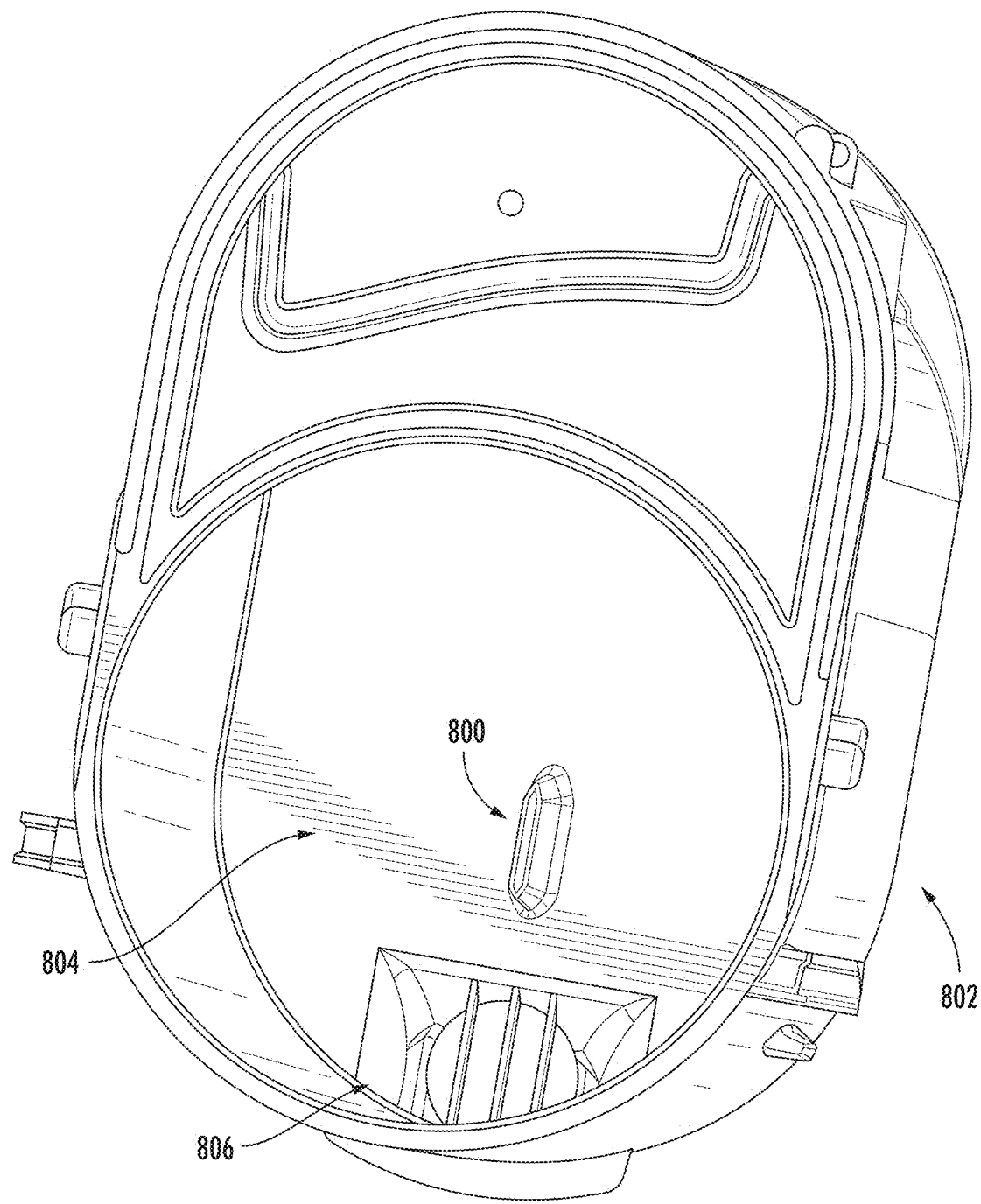
FIGS. 8A-8B show diagrams of an embodiment of a feature for preventing material buildup in a mixing vessel of a frozen drink maker, in accordance with some implementations of the disclosure.
Figure 8B:
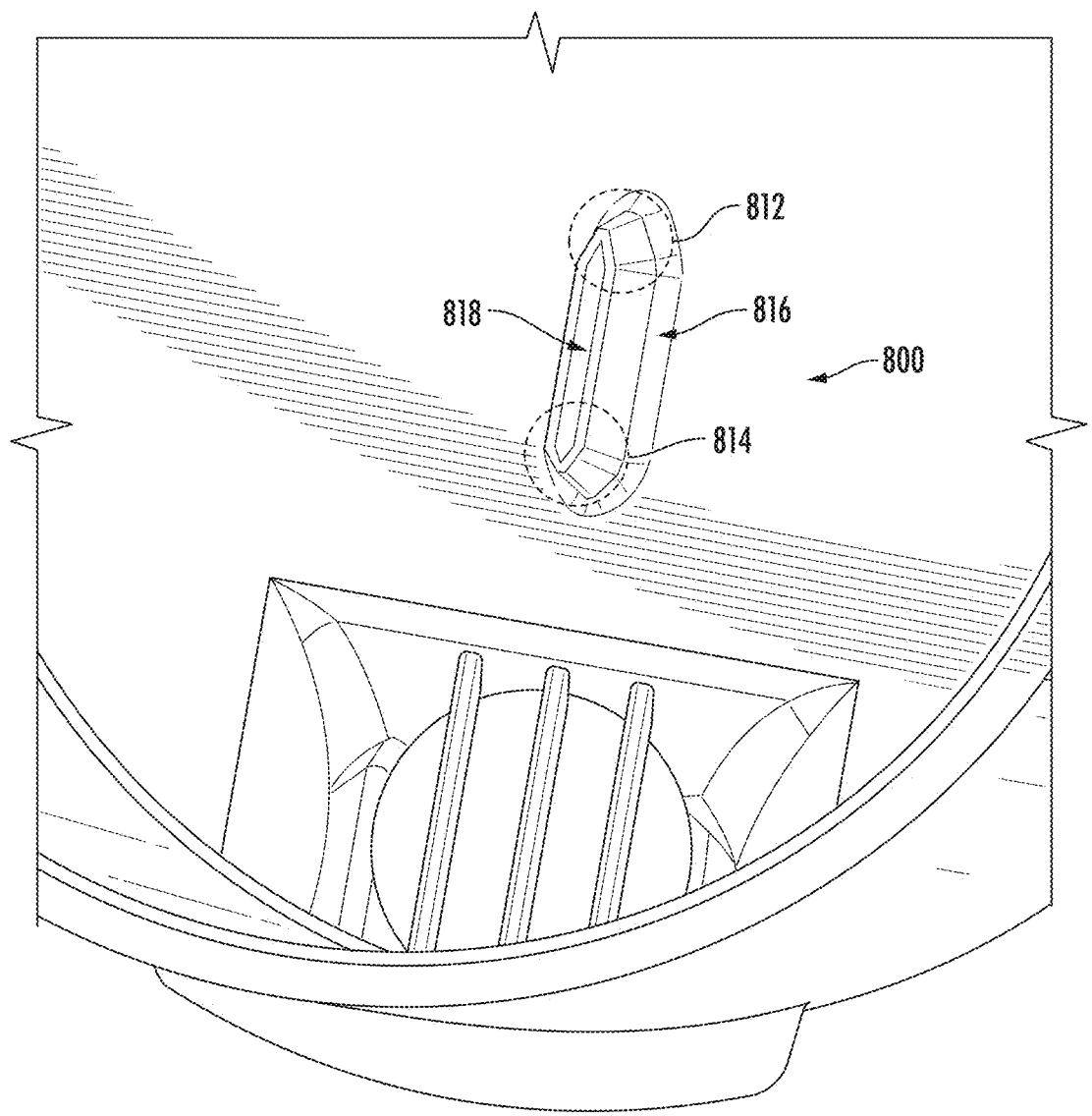

Referring now to FIGS. 8A-8B, FIGS. 8A-8B show diagrams of a feature for preventing material buildup in a mixing vessel of a frozen drink maker, in accordance with some implementations of the disclosure. As shown in FIG. 8A, the feature may include protrusion 800. Protrusion 800 may be positioned on and/or extend from interior wall 804 of mixing vessel 802 and into a vessel chamber of mixing vessel 802. As further shown in FIG. 8A, protrusion 800 may be adjacent outlet 806 of mixing vessel 802. In some implementations, mixing vessel 802 may be the same as or similar to mixing vessel 104. In some implementations, outlet 806 may be the same as or similar to outlet 602.

As further shown in FIG. 8B, protrusion 800 may include top edge portion 812 and bottom edge portion 814. In some implementations, top edge portion 812 and bottom edge portion 814 are asymmetrical. For example, top edge portion 812 may have a triangular prism shape and/or bottom edge portion 814 may have a hemi-spherical cylinder shape. In this way, protrusion 800 may have the shape of a fin. In some implementations, a cross-sectional geometry of protrusion 800 may be that protrusion 800 is thinner at a top (e.g., near top edge portion 812, according to a triangular prism shape) and thicker towards a bottom (e.g., near bottom edge portion 814, according to a hemi-spherical cylinder shape). In this way, protrusion 800 allows for material to slide down protrusion 800 without getting stuck on top edge portion 812 and the thicker bottom edge portion 814 provides strength for protrusion 800. As further shown in FIG. 8B, protrusion 800 may include fillet section 816 where protrusion 800 meets the interior wall 804 of mixing vessel 802. In some implementations, fillet section 816 may include a continuously rounded interior corner around the perimeter of protrusion 800. In some implementations, fillet section 816 may have a concave shape (e.g. a concave fillet). As further shown in FIG. 8B, protrusion 800 may include outer surface 818. In some implementations, outer surface 818 may include a flat surface. In some implementations, outer surface 818 may include a surface that is not flat.

Figure 9A:
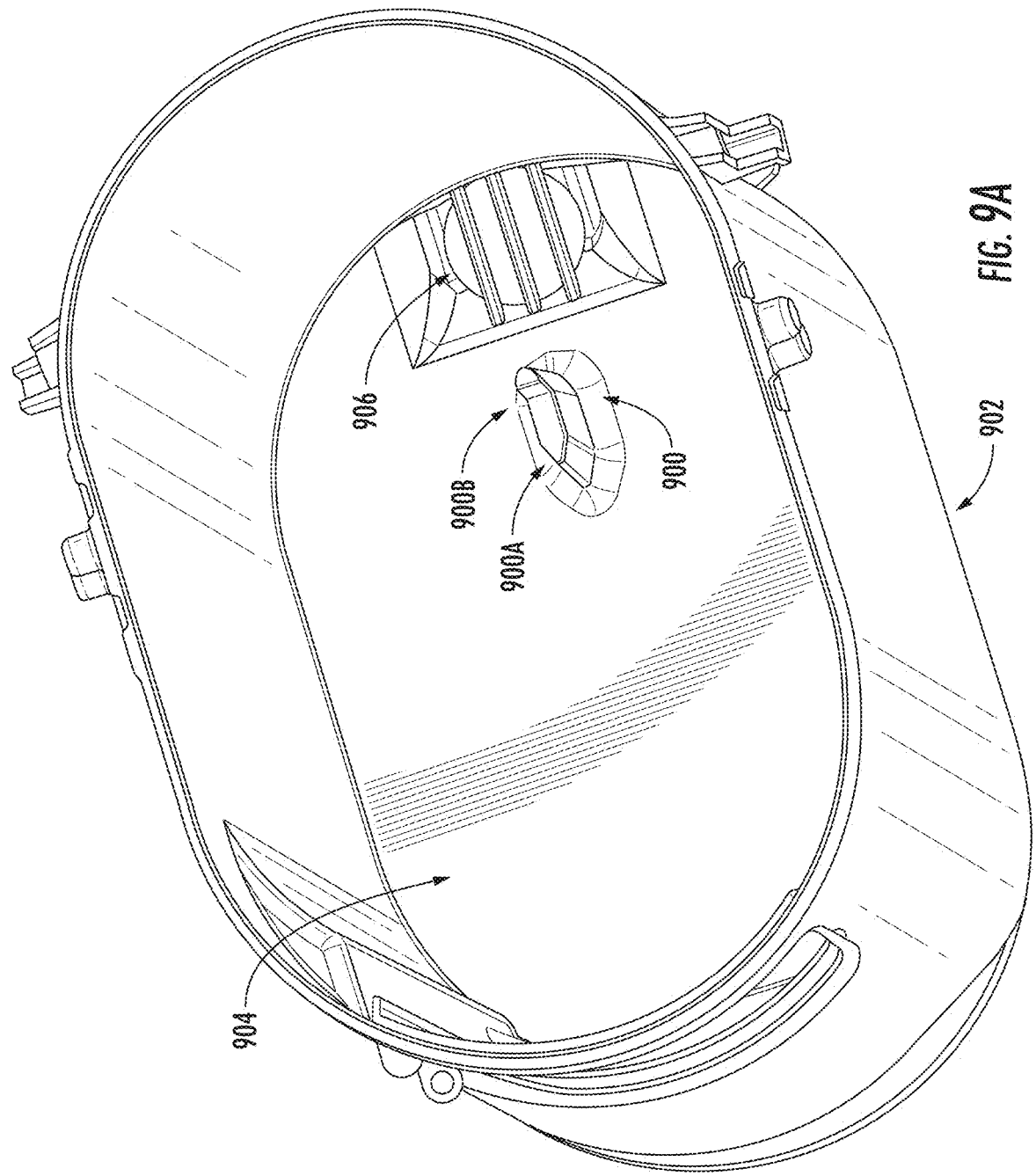
FIGS. 9A-9B show diagrams of another embodiment of a feature for preventing material buildup in a mixing vessel of a frozen drink maker, in accordance with some implementations of the disclosure.
Figure 9B:
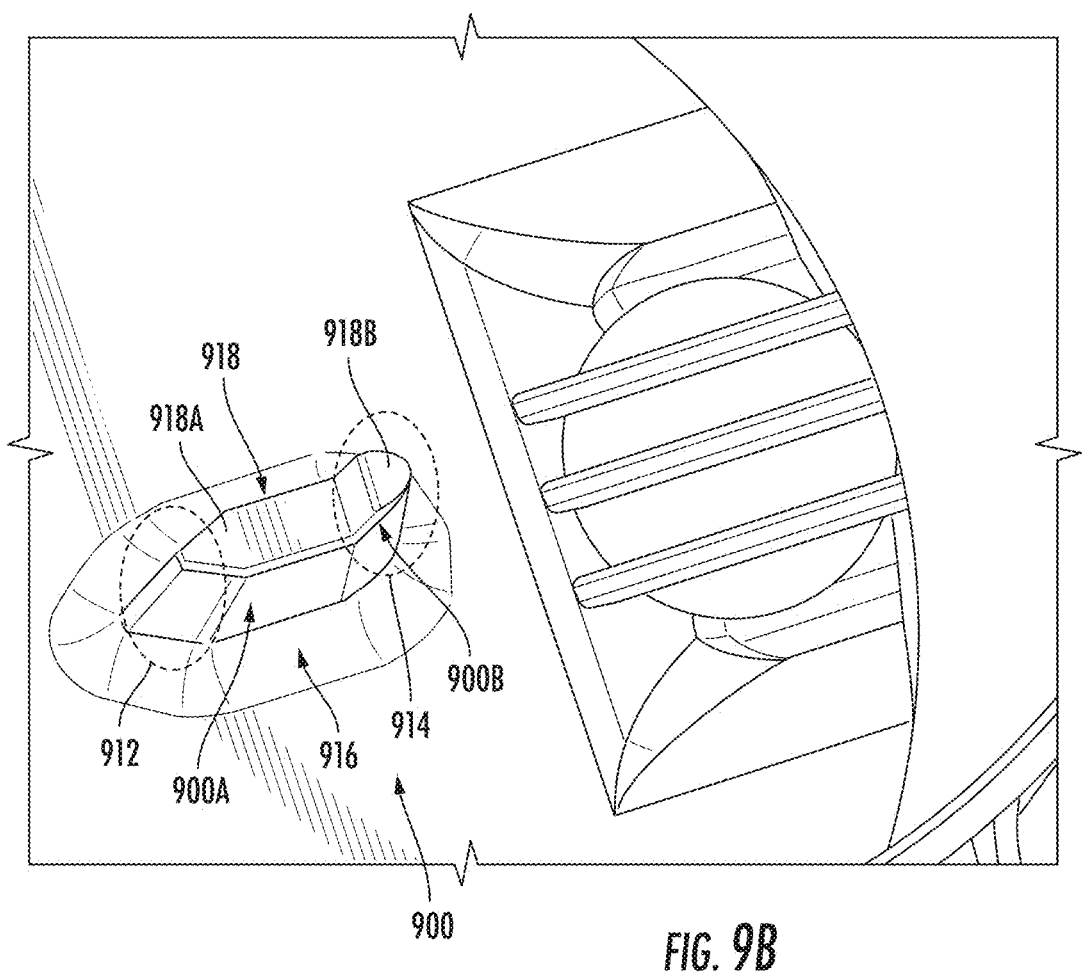

Referring now to FIGS. 9A-9B, FIGS. 9A-9B show diagrams of another feature for preventing material buildup in a mixing vessel of a frozen drink maker, in accordance with some implementations of the disclosure. As shown in FIG. 9A, the feature may include protrusion 900. In some implementations, protrusion 900 may be the same as or similar to protrusion 800. In some implementations, protrusion 900 may be positioned on and/or extend from interior wall 904 of mixing vessel 902 and into a vessel chamber of mixing vessel 902. As further shown in FIG. 9A, protrusion 900 may include base protruding section 900A and secondary protruding section 900B. In some implementations, secondary protruding section 900B may extend further into the vessel chamber and extend away from base protruding section 900A. In some implementations, secondary protruding section 900B may be formed on base protruding section 900A. In some implementations, secondary protruding section 900B may be smaller (e.g., occupy a smaller volume) than base protruding section 900A. As further shown in FIG. 9A, protrusion 900 may be adjacent outlet 906 of mixing vessel 902. In some implementations, mixing vessel 902 may be the same as or similar to mixing vessel 104 and/or mixing vessel 802. In some implementations, outlet 906 may be the same as or similar to outlet 602 and/or outlet 806.

As further shown in FIG. 9B, protrusion 900 may include top edge portion 912 and bottom edge portion 914. In some implementations, top edge portion 912 and bottom edge portion 914 are asymmetrical. For example, top edge portion 912 may have a triangular prism shape and/or bottom edge portion 914 may have a hemi-spherical cylinder shape. As further shown in FIG. 9B, protrusion 900 may include fillet section 916 where protrusion 900 meets interior wall 904 of mixing vessel 902. In some implementations, fillet section 916 may include a continuously rounded interior corner around a perimeter of protrusion 900. In some implementations, fillet section 916 may have a concave shape (e.g. a concave fillet). As further shown in FIG. 9B, protrusion 900 may include outer surface 918. In some implementations, outer surface 918 may include a surface that is not continuous (e.g., based on outer surfaces of base protruding section 900A and secondary protruding section 900B). In some implementations, outer surface 918 may include first outer surface 918A, which is an outer surface of base protruding section 900A, and second outer surface 918B, which is an outer surface of secondary protruding section 900B. In some implementations, first outer surface 918A and/or second outer surface 918B may include a flat surface. In some implementations, first outer surface 918A and/or second outer surface 918B may include a surface that is not flat.

Figure 10:
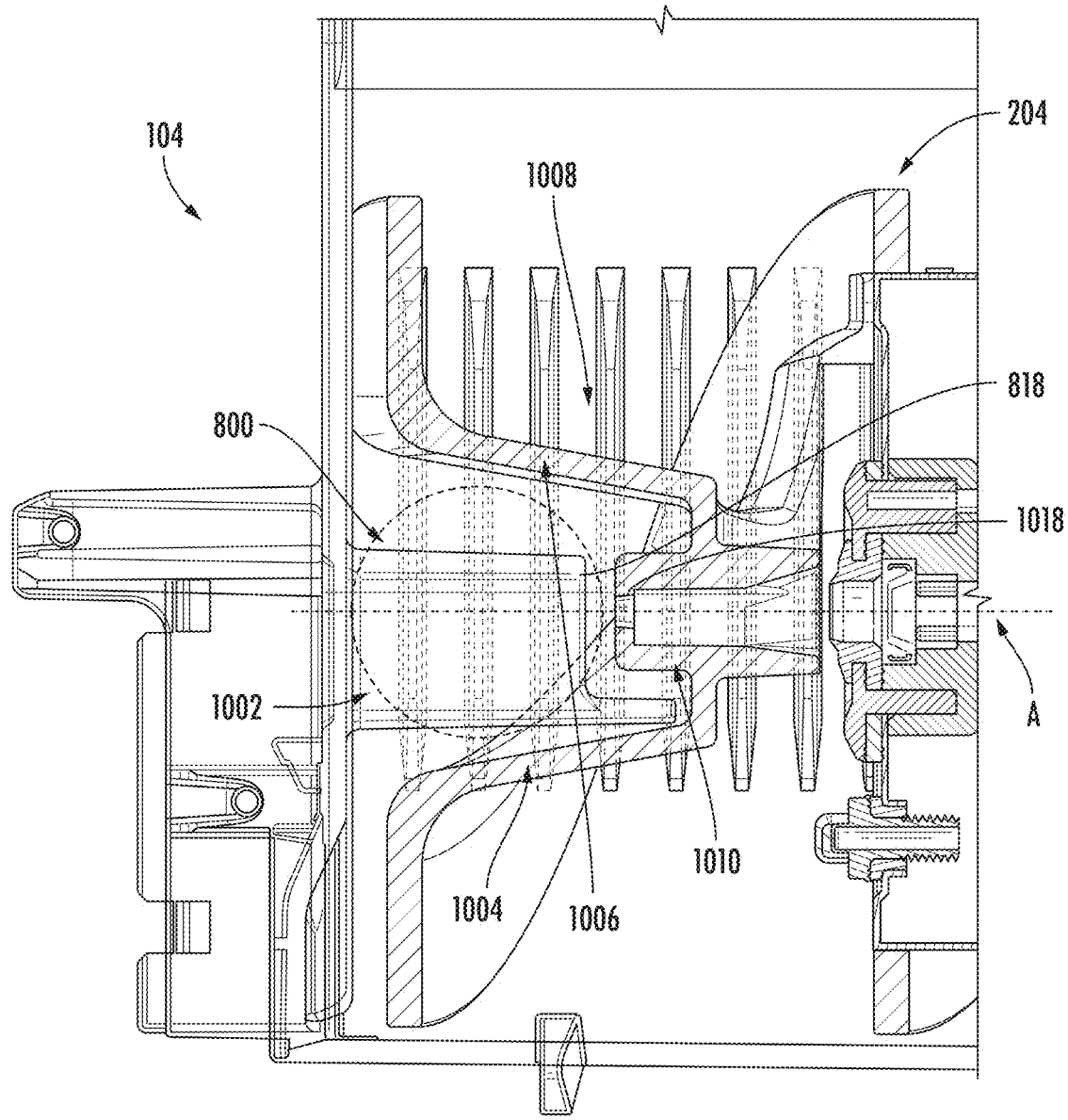
FIG. 10 shows a diagram of an embodiment of a protrusion for preventing material buildup in a mixing vessel of a frozen drink maker positioned in a mixing vessel of a drink maker, in accordance with some implementations of the disclosure.

Referring now to FIG. 10, FIG. 10 is a diagram of protrusion 800 positioned in mixing vessel 104 of drink maker 100. As shown in FIG. 10, protrusion 800 may be positioned on center axis A (e.g., so that center axis A passes through protrusion 800) of dasher 204 that is positioned within a vessel chamber of mixing vessel 104.

In some implementations, protrusion 800 may be vertically offset from center axis A. In this way, there may be more of space 1002 between top edge portion 812 and mixing blades 1004, 1006 of dasher 204 as compared to an amount of space 1002 between bottom edge portion 814 and mixing blades 1004, 1006 of dasher 204, which may allow for material to push up and over protrusion 800. The fin depth allows for most of ice puck at center of dasher 204 to be moved out of this space without causing interference with the dasher. Interference can cause unwanted sounds (squeaking, cyclical noises), premature wearing, and higher motor power draw. In some implementations, one or both of mixing blades 1004, 1006 may include a mixing blade that is configured to act as a push plate for a material within mixing vessel 104.

As further shown in FIG. 10, protrusion 800 is sized and configured to fit and/or extend into space 1002 defined by mixing blades 1004, 1006 of dasher 204 at first end 1008 of dasher 204. As further shown in FIG. 10, outer surface 818 of protrusion 800 may be facing outer surface 1018 of hub 1010 of dasher 204. In some implementations, protrusion 800 may extend away from first end 1008 of dasher 204 and into space 1002. For example, protrusion 800 may be attached to dasher 204 (e.g., attached to hub 1010 of dasher 204, to which mixing blades 1004, 1006 are attached). In some implementations, a plurality of protrusions 800 may be attached to dasher 204. In some implementations, space 1002 may be defined between mixing blades 1004, 1006 at first end 1008 of dasher 204 and may be a location that material builds up during operation of drink maker 100 (e.g., based on rotation of dasher 204 during operation) if protrusion 800 is not present. In some implementations, protrusion 800 may be sized and configured to fit into and/or occupy space 1002 (e.g., occupy more than 50% of space 1002, occupy more than 75% of space 1002, occupy more than 90% of space 1002, etc.) without coming into contact with mixing blades 1004, 1006 of dasher 204. In some implementations, protrusion 800 may be configured to be stationary and to avoid contact with mixing blades 1004, 1006 of dasher 204, as dasher 204 rotates within the vessel chamber of mixing vessel 104.

Figure 11:
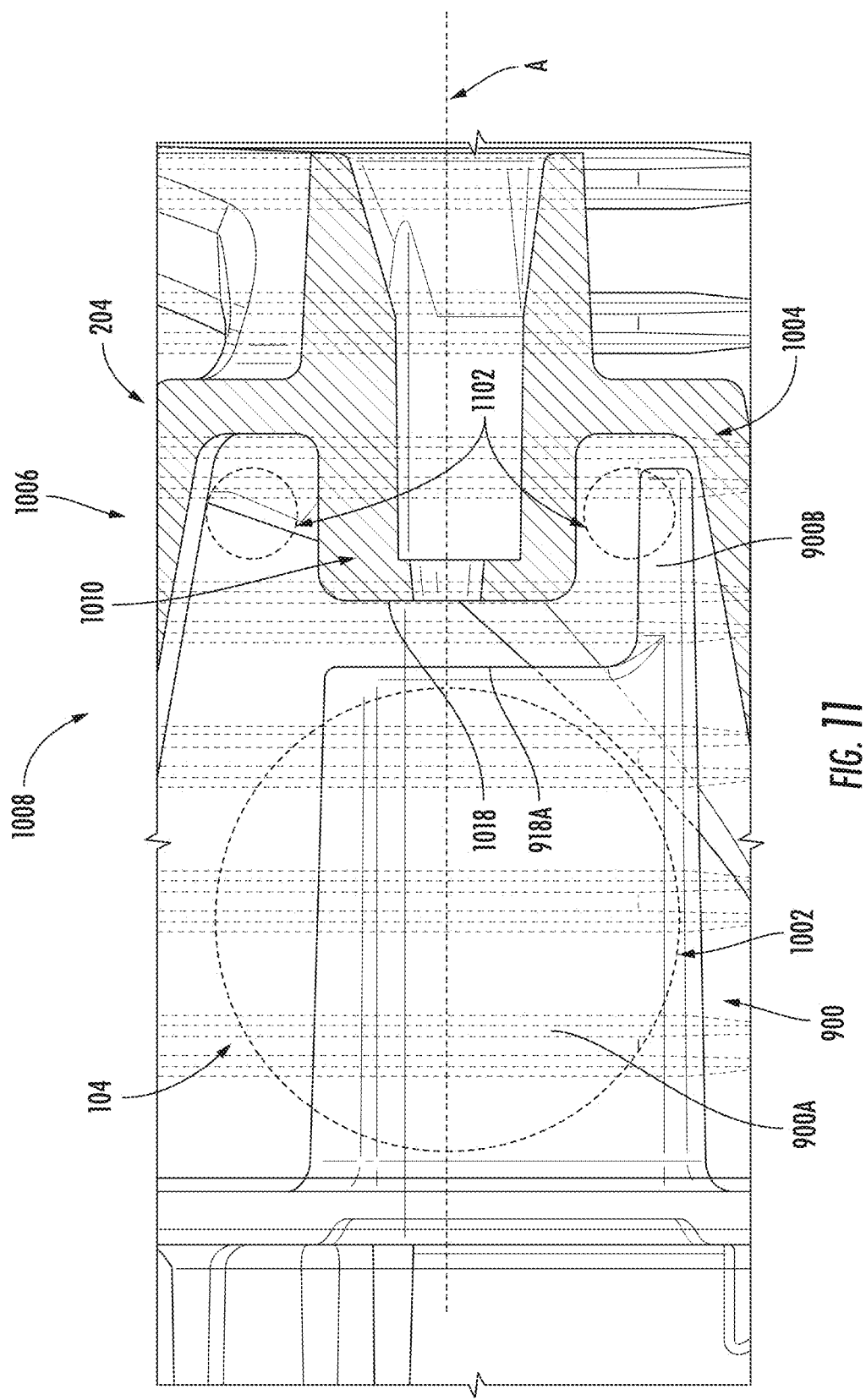
FIG. 11 shows a diagram of another embodiment of a protrusion for preventing material buildup in a mixing vessel of a frozen drink maker positioned in a mixing vessel of a drink maker, in accordance with some implementations of the disclosure.

Referring now to FIG. 11, FIG. 11 is a diagram of protrusion 900 positioned in mixing vessel 104 of drink maker 100. As shown in FIG. 11, protrusion 900 may be positioned on center axis A (e.g., so that center axis A passes through protrusion 900) of dasher 204 that is positioned within a vessel chamber of mixing vessel 104. As further shown in FIG. 11, protrusion 900 is sized and configured to fit and/or extend into space 1002. As further shown in FIG. 11, first outer surface 918A of protrusion 900 may be facing outer surface 1018 of hub 1010 of dasher 204. In some implementations, protrusion 900 may extend away from first end 1008 of dasher 204 and into space 1002. For example, protrusion 900 may be attached to dasher 204 (e.g., attached to hub 1010 of dasher 204, to which mixing blades 1004, 1006 are attached). In some implementations, a plurality of protrusions 900 may be attached to dasher 204.

As further shown in FIG. 11, base protruding section 900A is sized and configured to fit into space 1002 defined by first mixing blade 1004 and second mixing blade 1006 of dasher 204, and secondary protruding section 900B is sized and configured to fit into second space 1102 defined between first mixing blade 1004 and hub 1010 and between second mixing blade 1006 and hub 1010. In some implementations, protrusion 900 may be sized and configured to fit into and/or occupy space 1002 (e.g., occupy more than 50% of space 1002, occupy more than 75% of space 1002, occupy more than 90% of space 1002, etc.) without coming into contact with mixing blades 1004, 1006 of dasher 204. In some implementations, protrusion 900 may be configured to be stationary and to avoid contact with mixing blades 1004, 1006 of dasher 204, as dasher 204 rotates within the vessel chamber of mixing vessel 104.

Figure 12A:
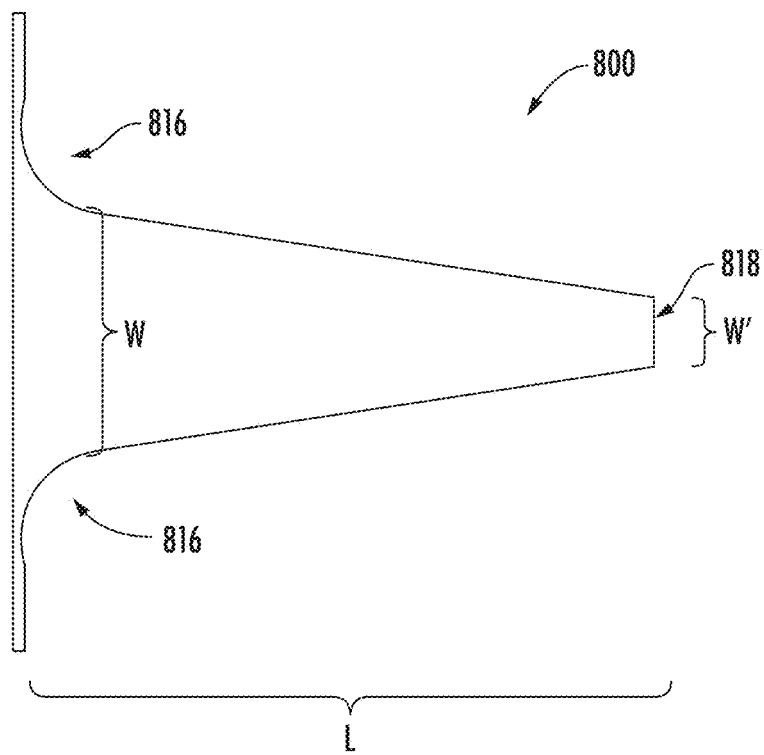
FIGS. 12A-12B show views of a protrusion for preventing material buildup in a mixing vessel of a frozen drink maker, in accordance with some implementations of the disclosure.
Figure 12B:
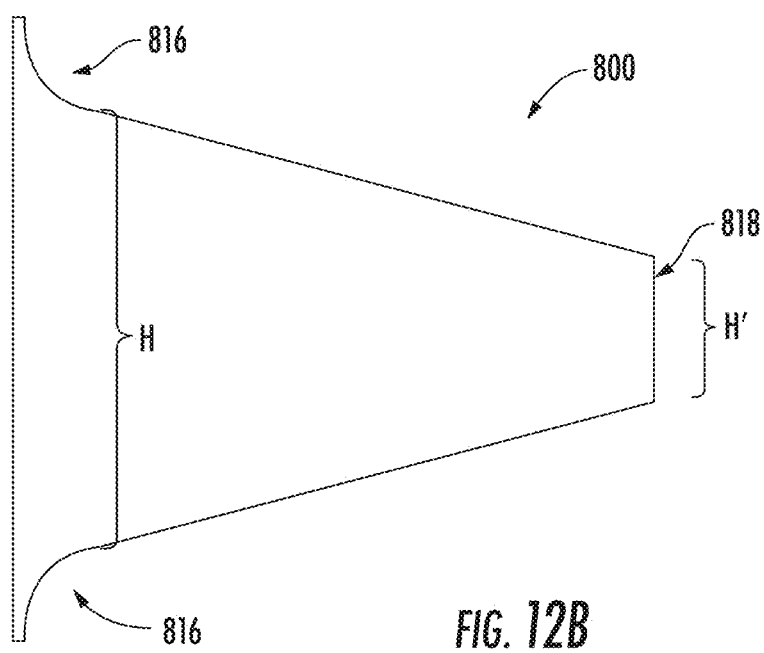

Referring now to FIGS. 12A-12B, FIGS. 12A-12B show views of protrusion 800. FIG. 12A is a top down view of protrusion 800, and FIG. 12B is a side view of protrusion 800. In some implementations, a length (an overall length, represented as "L" in FIG. 12A) of protrusion 800 may be in a range of 24 mm to 40 mm. In one example, the length of protrusion 800 may be equal to 32 mm. In some implementations, a radius of fillet section 816 may be in a range of 2 mm to 6 mm. In one example, a radius of fillet section 816 may be equal to 4 mm.

In some implementations, a width (represented as "W" in FIG. 12A) of a base section of protrusion 800 (e.g., a width of protrusion 800 at a point where fillet section 816 begins) may be in a range of 3 mm to 6 mm. In one example, a width of the base section of protrusion 800 may be equal to 4.7 mm. In some implementations, a width (represented as "W'" in FIG. 12A) of outer surface 818 of protrusion 800 may be in a range of 2.5 mm to 5.5 mm. In one example, a width of outer surface 818 of protrusion 800 may be equal to 4.2 mm.

In some implementations, a height (represented as "H" in FIG. 12B) of a base section of protrusion 800 (e.g., a height of protrusion 800 at a point where fillet section 816 begins) may be in a range of 16.5 mm to 28.5 mm. In one example, a height of the base section of protrusion 800 may be equal to 22.5 mm. In some implementations, a height (represented as "H'" in FIG. 12B) of outer surface 818 of protrusion 800 may be in a range of 14 mm to 28 mm. In one example, a height of outer surface 818 of protrusion 800 may be equal to 21 mm.

Figure 13:
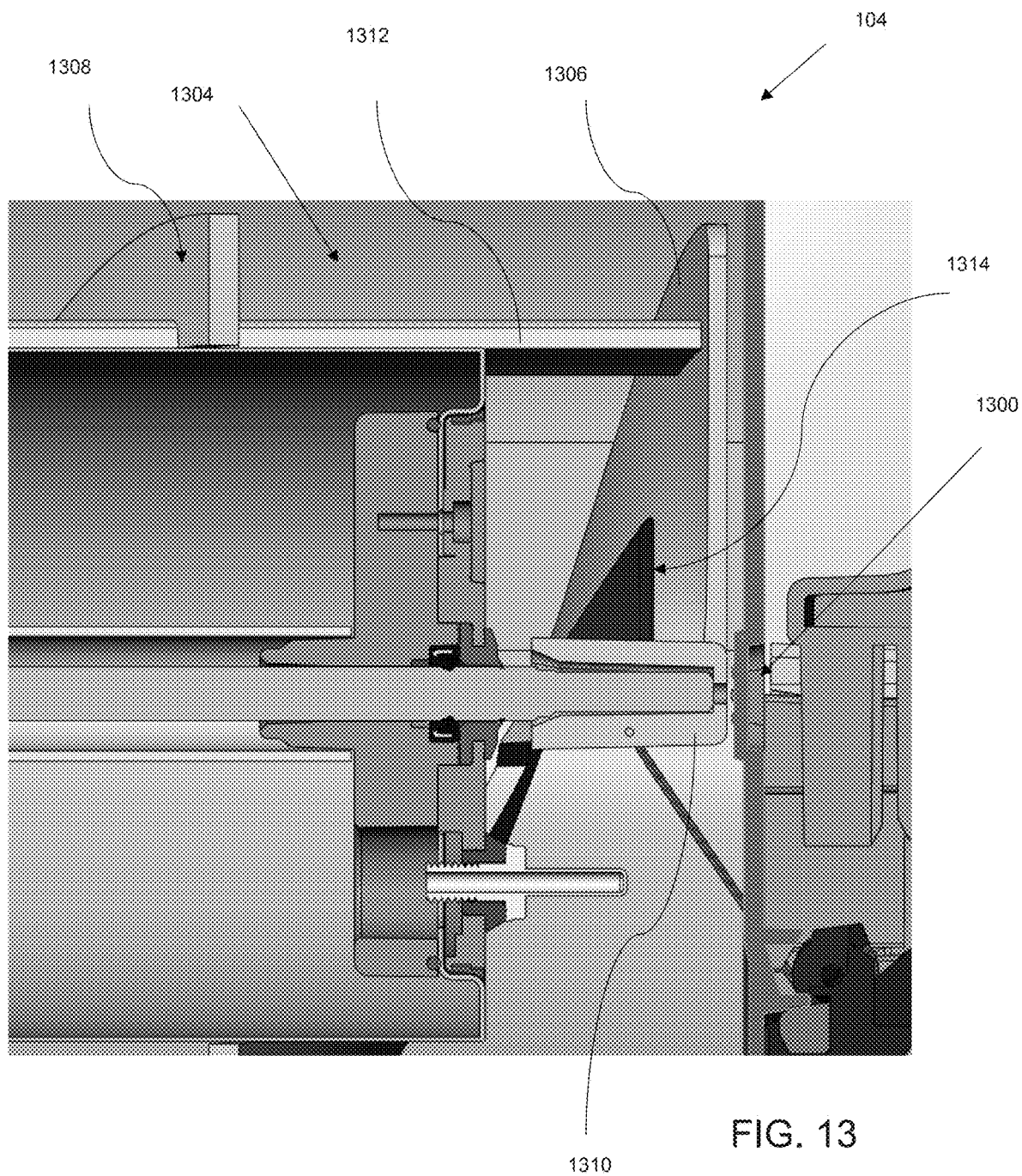
FIG. 13 shows a diagram of an embodiment of a protrusion and a dasher for preventing material buildup in a mixing vessel of a frozen drink maker positioned in a mixing vessel of a drink maker, in accordance with some implementations of the disclosure.

Referring now to FIG. 13, FIG. 13 is a cross section view of dasher 1304 and protrusion 1300 positioned in mixing vessel 104 of drink maker 100. In some implementations, dasher 1304 may be the same as or similar to dasher 204. In some implementations, protrusion 1300 may be the same as or similar to protrusion 800 and/or protrusion 900. As shown in FIG. 13 dasher 1304 may include mixing blade 1306 (e.g., a mixing blade that is configured to act as a push plate for a material within mixing vessel 104), helical stirring portion 1308, hub 1310, outer spine 1312, and dasher cap portion 1314. In some implementations, mixing blade 1306 may be sized and configured to act as a main structure for causing a material within a vessel chamber to move (e.g., rotate), and helical stirring portion 1308 may stir the material, as well as direct the material towards mixing blade 1306. In some implementations, mixing blade 1306 may be attached to hub 1310 and be flush with hub 1310 (e.g., no portion of mixing blade 1306 extends past hub 1310), and outer spine 1312 may be attached to mixing blade 1306 and to helical stirring portion 1308 to provide support for mixing blade 1306 and helical stirring portion 1308. In some implementations, outer spine 1312 may be sized and configured to fit around a perimeter (e.g., a circumference) of an evaporator (e.g., evaporator 202) of drink maker 100. As further shown in FIG. 13, dasher cap portion 1314 may be attached to mixing blade 1306. In this way, dasher cap portion 1314 may prevent a buildup of material in a space behind mixing blade 1306 and/or between mixing blade 1306 and helical stirring portion 1308.

As further shown in FIG. 13, protrusion 1300 may be sized and configured to avoid contact with hub 1310 and mixing blade 1306 of dasher 1304. In some implementations, a length (an overall length) of protrusion 1300 may be in a range of 2 mm to 5 mm. In one example, the length of protrusion 1300 may be equal to 3.5 mm.

Figure 14A:
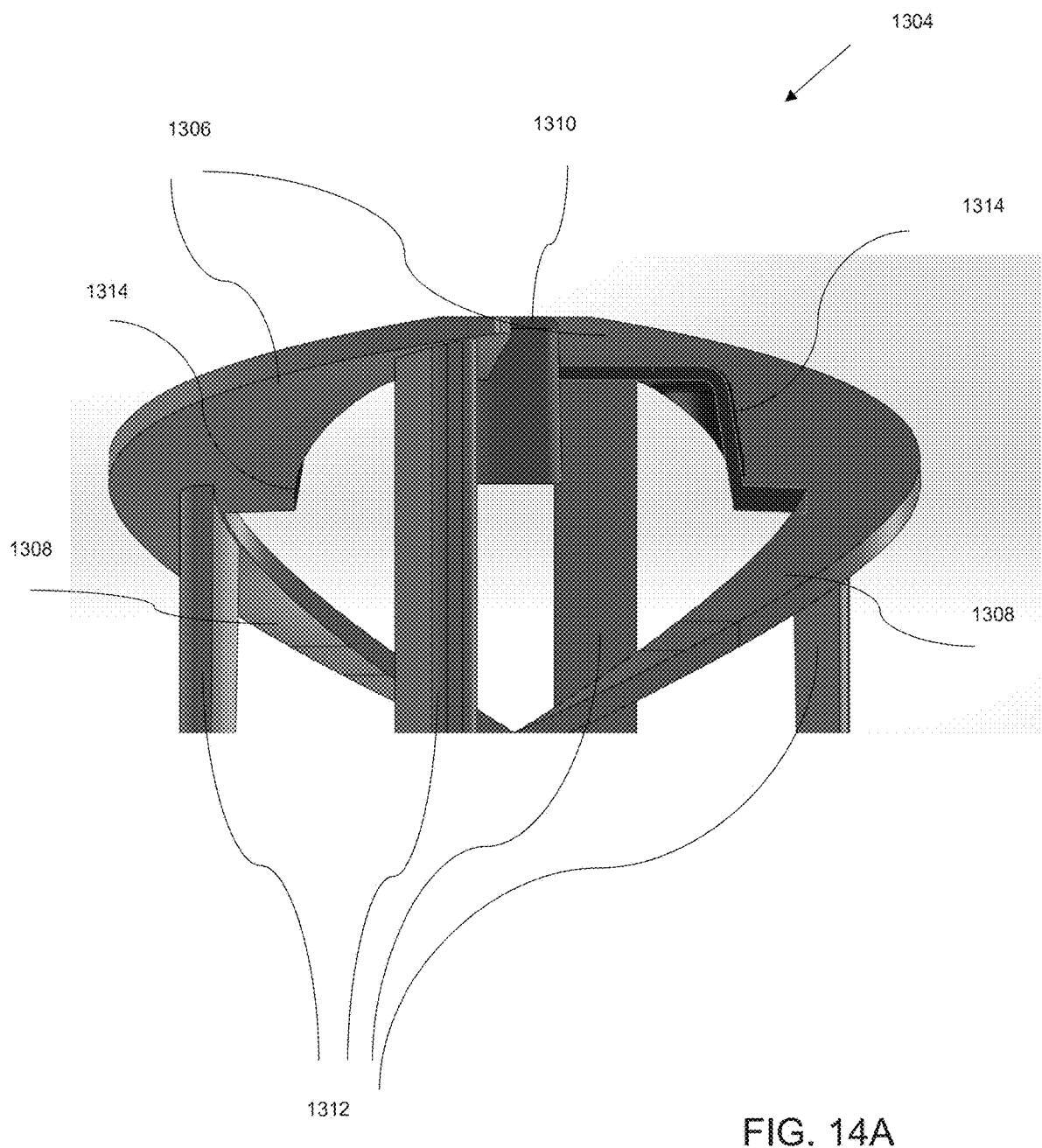
FIGS. 14A and 14B are diagrams of a dasher shown in FIG. 13, in accordance with some implementations of the disclosure.
Figure 14B:
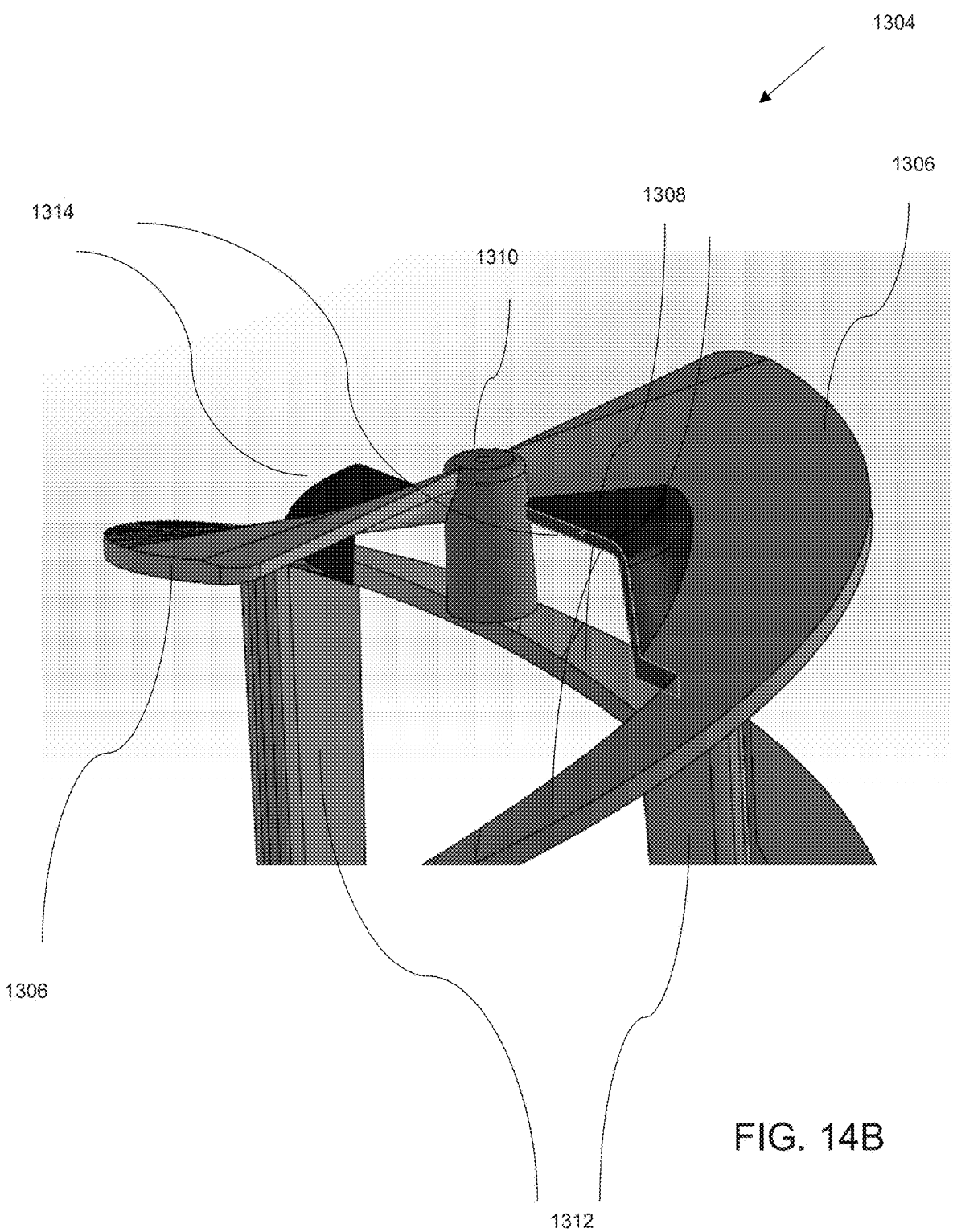

Referring now to FIGS. 14A and 14B, FIGS. 14A and 14B are diagrams of dasher 1304. As shown in FIGS. 14A and 14B, dasher 1304 may include mixing blades 1306, helical stirring portions 1308, hub 1310, outer spines 1312, and dasher cap portions 1314. As shown in FIG. 14A, outer spines 1312 may attached at various locations of mixing blades 1306 and helical stirring portions 1308. In one example, a first set of outer spines 1312 may be attached to a front end of mixing blades 1306, and a second set of outer spines 1312 may be attached at a location where mixing blades 1306 meets helical stirring portions 1308. As shown in FIG. 14B, dasher cap portions 1314 may have an approximated cup shape that is a section (e.g., a quarter section, for example, a 90 degree arc section, a sixth section, for example, a 60 degree arc section, a twelfth section, for example, a 30 arc section, etc.) of a cylinder with a cap. In this way, dasher cap portions 1314 may have a shape that effectively induces movement of a material within a vessel chamber of mixing vessel 104, in particular, movement of the material around mixing blades 1306. As further shown in FIG. 14B, dasher cap portions 1314 may be attached to hub 1310 and may be attached along an inner edge (e.g., an inner edge facing towards hub 1310) of mixing blade 1306.

It should be appreciated that the various implementations described herein are not limited to making frozen or semi-frozen drinks, but may be applied to produce a cold and/or cooled drink product that is cooler than a received drink product, but not frozen or semi-frozen. For example, in some implementations, the same or similar mechanisms and/or techniques may be used as part of a cold drink machine and/or cooled drink maker to produce, maintain and dispense cold drinks.

As discussed with respect to FIG. 4, actions associated with configuring or controlling a frozen drink maker such as frozen drink maker 100 and processes described herein can be performed by one or more programmable processors executing one or more computer programs to control or to perform all or some of the operations described herein. All or part of the frozen drink maker 100 systems and processes can be configured or controlled by special purpose logic circuitry, such as, an FPGA and/or an ASIC or embedded microprocessor(s) localized to the instrument hardware.

Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

What is claimed is:

1. A feature for preventing material buildup in a mixing vessel of a frozen drink maker, comprising:
   at least one protrusion extending into a vessel chamber of the mixing vessel;
   wherein the at least one protrusion is positioned on a central axis of a dasher that is positioned within the vessel chamber; and wherein the at least one protrusion is sized and configured to fit into a space defined by (i) one or more mixing blades of the dasher at a front end of the dasher, (ii) an interior wall of the mixing vessel, and (iii) a hub of the dasher, wherein the hub is proximate to the front end of the dasher, positioned on the central axis of the dasher, and connected to the one or more mixing blades.

2. The feature of claim 1, wherein the at least one protrusion extends from the interior wall of the mixing vessel and into the space defined by the one or more mixing blades, the interior wall, and the hub.

3. The feature of claim 1, wherein the at least one protrusion extends away from the front end of the dasher and into the space defined by the one or more mixing blades, the interior wall, and the hub.

4. The feature of claim 1, wherein the at least one protrusion is positioned on the interior wall of the mixing vessel and adjacent an outlet of the mixing vessel.

5. The feature of claim 1, wherein the at least one protrusion comprises a base protruding section and a secondary protruding section that extends away from the base protruding section, and wherein the secondary protruding section is smaller than the base protruding section.

6. The feature of claim 5, wherein the one or more mixing blades of the dasher comprises a first mixing blade and a second mixing blade connected to the hub, wherein the base protruding section is sized and configured to fit into a first space defined by the first mixing blade and the second mixing blade of the dasher, and wherein the secondary protruding section is sized and configured to fit into a second space defined between the first mixing blade and the hub and between the second mixing blade and the hub.

7. The feature of claim 6, wherein the at least one protrusion comprises a flat outer surface that faces an outer surface of the hub of the dasher.

8. The feature of claim 1, wherein the at least one protrusion extends away from the interior wall of the mixing vessel and into the space defined by the one or more mixing blades, the interior wall, and the hub, wherein the at least one protrusion comprises a top edge portion and a bottom edge portion, and wherein the top edge portion has a triangular prism shape and the bottom edge portion has a hemi-spherical cylinder shape.

9. The feature of claim 8, wherein the at least one protrusion comprises a fillet section, where the at least one protrusion meets the interior wall of the mixing vessel.

10. The feature of claim 1, wherein the at least one protrusion is configured to be stationary and to avoid contact with the one or more mixing blades of the dasher, as the dasher rotates within the vessel chamber of the mixing vessel.

11. A frozen drink maker, comprising:
a mixing vessel comprising a vessel chamber that is configured to receive a drink product to be processed, the vessel chamber comprising: a front, a rear, a right side, a left side, a top, and a bottom;
a dasher configured to be positioned within the mixing vessel, the dasher comprising:
one or more mixing blades at a front end of the dasher; and
a hub, wherein the one or more mixing blades of the dasher are configured to rotate about a central axis to move the drink product within the vessel chamber, and wherein the hub is proximate to the front end of the dasher, positioned on the central axis of the dasher, and connected to the one or more mixing blades; and
at least one protrusion extending into the vessel chamber of the mixing vessel, wherein the at least one protrusion is positioned on the central axis of the dasher, and wherein the at least one protrusion is sized and configured to fit into a space defined by (i) the one or more mixing blades of the dasher at the front end of the dasher, (ii) an interior wall of the mixing vessel, and (iii) the hub of the dasher.

12. The frozen drink maker of claim 11, wherein the at least one protrusion extends from the interior wall of the mixing vessel and into the space defined by the one or more mixing blades, the interior wall, and the hub.

13. The frozen drink maker of claim 11, wherein the at least one protrusion extends away from the front end of the dasher and into the space defined by the one or more mixing blades, the interior wall, and the hub.

14. The frozen drink maker of claim 11, wherein the at least one protrusion is positioned on the interior wall of the mixing vessel and adjacent an outlet of the mixing vessel.

15. The frozen drink maker of claim 11, wherein the at least one protrusion comprises a base protruding section and a secondary protruding section that extends away from the base protruding section, and wherein the secondary protruding section is smaller than the base protruding section.

16. The frozen drink maker of claim 15, wherein the one or more mixing blades of the dasher comprises a first mixing blade and a second mixing blade connected to the hub, wherein the base protruding section is sized and configured to fit into a first space defined by the first mixing blade and the second mixing blade of the dasher, and wherein the secondary protruding section is sized and configured to fit into a second space defined between the first mixing blade and the hub and between the second mixing blade and the hub.

17. The frozen drink maker of claim 16, wherein the at least one protrusion comprises a flat outer surface that faces an outer surface of the hub of the dasher.

18. The frozen drink maker of claim 11, wherein the at least one protrusion extends away from the interior wall of the mixing vessel and into the space defined by the one or more mixing blades, the interior wall, and the hub, wherein the at least one protrusion comprises a top edge portion and a bottom edge portion, and wherein the top edge portion has a triangular prism shape and the bottom edge portion has a hemi-spherical cylinder shape.

19. The frozen drink maker of claim 18, wherein the at least one protrusion comprises a fillet section, where the at least one protrusion meets the interior wall of the mixing vessel.

20. The frozen drink maker of claim 11, wherein the at least one protrusion is configured to be stationary and to avoid contact with the one or more mixing blades of the dasher, as the dasher rotates within the vessel chamber of the mixing vessel.

* * * * *